United States Patent
Yoon et al.

(10) Patent No.: US 12,443,390 B2
(45) Date of Patent: Oct. 14, 2025

(54) ELECTRONIC DEVICE AND CONTROL METHOD THEREFOR

(71) Applicant: SAMSUNG ELECTRONICS CO., LTD., Suwon-si (KR)

(72) Inventors: Chang-bae Yoon, Seoul (KR); Jeong-in Kim, Incheon (KR); Se-won Oh, Seoul (KR); Hyo-young Cho, Seoul (KR); Kyung-rae Kim, Seoul (KR); Hee-jung Kim, Seoul (KR); Hyun-jin Yang, Seoul (KR); Ji-won Cha, Bucheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/534,300

(22) Filed: Dec. 8, 2023

(65) Prior Publication Data

US 2024/0111848 A1 Apr. 4, 2024

Related U.S. Application Data

(63) Continuation of application No. 16/629,399, filed as application No. PCT/KR2018/010921 on Sep. 17, 2018, now Pat. No. 11,874,904.
(Continued)

(30) Foreign Application Priority Data

Nov. 22, 2017 (KR) .................. 10-2017-0156173
Sep. 13, 2018 (KR) .................. 10-2018-0109849

(51) Int. Cl.
*G06F 3/16* (2006.01)
*G06F 9/451* (2018.01)
(Continued)

(52) U.S. Cl.
CPC .............. *G06F 3/167* (2013.01); *G06F 9/453* (2018.02); *G06F 21/31* (2013.01); *G06N 3/004* (2013.01);
(Continued)

(58) Field of Classification Search
CPC ........ G06F 21/31; G06F 3/167; G06F 3/0484; G06F 9/453; G06N 3/004; G06N 20/00;
(Continued)

(56) References Cited

U.S. PATENT DOCUMENTS 7,562,385 B2   7/2009  Thione et al.
9,112,849 B1*  8/2015  Werkelin Ahlin ........ G06F 3/00
(Continued)

FOREIGN PATENT DOCUMENTS

CN        102340331        2/2012
CN        102629246        8/2012
(Continued)

OTHER PUBLICATIONS

Office Action dated Feb. 19, 2024 in Chinese Patent Application No. 202210639432.1 and English-language translation.
(Continued)

*Primary Examiner* — Rami R Okasha
(74) *Attorney, Agent, or Firm* — Nixon & Vanderhye, P.C.

(57) ABSTRACT

An example electronic device includes a display, a communication circuit, a memory, and at least one processor configured to, based on a signal for requesting transmission of identification information including a call word for using first mode of an artificial intelligence assistant function of the electronic device being received, from another electronic device, through the communication circuit using first communication method, control the display to display a user interface for requesting user confirmation for transmission
(Continued)

of the identification information; control the communication circuit to transmit the identification information to the another electronic device as a result of user confirmation through the user interface; and receive information for using a second communication method from the another electronic device.

16 Claims, 19 Drawing Sheets

Related U.S. Application Data

(60) Provisional application No. 62/559,095, filed on Sep. 15, 2017.

(51) Int. Cl.
*G06F 21/31* (2013.01)
*G06N 3/004* (2023.01)
*G10L 15/22* (2006.01)
*H04L 69/08* (2022.01)
*G06N 20/00* (2019.01)

(52) U.S. Cl.
CPC .............. *H04L 69/08* (2013.01); *G06N 20/00* (2019.01); *G10L 2015/223* (2013.01)

(58) Field of Classification Search
CPC ... G10L 2015/223; G10L 15/26; G10L 15/22; H04L 63/0853; H04L 69/08
See application file for complete search history.

(56) References Cited

U.S. PATENT DOCUMENTS

| | | | |
|---|---|---|---|
| 9,261,969 B2 | 2/2016 | Dangi et al. | |
| 9,640,183 B2 | 5/2017 | Jung et al. | |
| 9,640,188 B2 | 5/2017 | Davis | |
| 10,521,185 B1* | 12/2019 | Kim | H04R 3/00 |
| 2003/0073411 A1 | 4/2003 | Meade, II | |
| 2013/0036231 A1 | 2/2013 | Suumaki | |
| 2013/0085755 A1 | 4/2013 | Bringert | |
| 2013/0169524 A1 | 7/2013 | Han et al. | |
| 2013/0300546 A1 | 11/2013 | Kim et al. | |
| 2013/0309971 A1 | 11/2013 | Kiukkonen | |
| 2015/0023183 A1 | 1/2015 | Ilsar | |
| 2015/0167995 A1 | 6/2015 | Fadel | |
| 2015/0169284 A1 | 6/2015 | Quast | |
| 2015/0189504 A1 | 7/2015 | Chew | |
| 2015/0213355 A1 | 7/2015 | Sharma et al. | |
| 2015/0287413 A1 | 10/2015 | Jung et al. | |
| 2015/0372746 A1* | 12/2015 | Xie | H04W 4/80 455/11.1 |
| 2015/0379866 A1 | 12/2015 | Paek et al. | |
| 2015/0379993 A1 | 12/2015 | Subhojit | |
| 2016/0070580 A1 | 3/2016 | Johnson et al. | |
| 2016/0173578 A1 | 6/2016 | Sharma et al. | |
| 2016/0179462 A1 | 6/2016 | Bjorkengren | |
| 2016/0227408 A1 | 8/2016 | Sherin | |
| 2016/0300571 A1 | 10/2016 | Foerster | |
| 2016/0337497 A1 | 11/2016 | Smith | |
| 2017/0230497 A1 | 8/2017 | Kim | |
| 2017/0318075 A1 | 11/2017 | Liensberger | |
| 2018/0061418 A1 | 3/2018 | Patil | |
| 2018/0096283 A1 | 4/2018 | Wang | |
| 2018/0096284 A1 | 4/2018 | Stets | |
| 2018/0182397 A1* | 6/2018 | Carbune | G10L 15/22 |
| 2018/0191829 A1* | 7/2018 | Morales | H04W 4/70 |
| 2018/0288067 A1 | 10/2018 | Ni | |
| 2018/0293484 A1 | 10/2018 | Wang | |
| 2018/0293981 A1 | 10/2018 | Ni et al. | |
| 2018/0332118 A1 | 11/2018 | Phipps | |
| 2018/0337799 A1* | 11/2018 | Levi | H04L 12/2816 |
| 2018/0342021 A1 | 11/2018 | Gulec | |
| 2019/0109880 A1 | 4/2019 | Phillips | |
| 2019/0166073 A1* | 5/2019 | Aggarwal | G06F 40/10 |
| 2020/0105250 A1* | 4/2020 | Patel | G10L 15/07 |
| 2021/0124840 A1* | 4/2021 | Dotan-Cohen | H04W 12/033 |
| 2022/0189471 A1* | 6/2022 | Sharifi | G10L 15/22 |

FOREIGN PATENT DOCUMENTS

| | | |
|---|---|---|
| CN | 103051734 | 4/2013 |
| CN | 103187054 | 7/2013 |
| CN | 104978965 | 10/2015 |
| CN | 106326486 | 1/2017 |
| CN | 106898349 A | 6/2017 |
| EP | 2784774 A1 | 10/2014 |
| EP | 3 179 474 | 6/2017 |
| JP | 2006-302292 | 11/2006 |
| KR | 10-2007-0015661 | 2/2007 |
| KR | 10-2009-0124668 | 12/2009 |
| KR | 10-2012-0013864 | 2/2012 |
| KR | 10-2013-0063399 | 6/2013 |
| KR | 10-2013-0116107 | 10/2013 |
| KR | 10-2017-0056586 | 5/2017 |

OTHER PUBLICATIONS

Haizhi et al., "Cloud Computing and Control System Based on Speech Recognition", Computers and Telecommunications, Issue Z1, Feb. 10, 2016 (3 pages) (Abstract).
Andrew Shuman, "Hey Cortana, open Alexa: Microsoft and Amazon's first-of-its-kind collaboration", Official Microsoft Blog, Aug. 30, 2017, 3 pages, https://blogs.microsoft.com/blog/2017/08/30/hey-cortana-open-alexa-microsoft-amazons-first-kind-collaboration/.
International Search Report for PCT/KR2018/010921, with English Translation, dated Feb. 1, 2019, 5 pages.
Written Opinion of the ISA for PCT/KR2018/010921, with English Translation, dated Feb. 1, 2019, 13 pages.
Extended Search Report dated Apr. 29, 2020 in counterpart European Patent Application No. 18856663.2.
Communication pursuant to Article 94(3) EPC dated Mar. 23, 2021 in EP Application No. 18856663.2.
Examination Report dated Mar. 19, 2021 in IN Application No. 202027007693 and English-language translation.
Notification of the First Office Action dated Aug. 27, 2021 in counterpart Chinese Patent Application No. 201880055363.1 and English-language translation.
Request for the Submission of an Opinion dated Aug. 19, 2022 in counterpart KR Patent Application No. 10-2018-0109849 and English-language translation.
Extended Search Report dated Nov. 29, 2022 in EP Application No. 22193890.5.
Hearing Notice dated Jul. 25, 2023 in Indian Patent Application No. 202027007693 and English-language translation.
Yoon et al, U.S. Appl. No. 16/629,399, filed Jan. 6, 2020, allowed.
Communication pursuant to Article 94(3) EPC dated Oct. 1, 2024 in European Patent Application No. 22193890.5.

* cited by examiner

FIG. 5
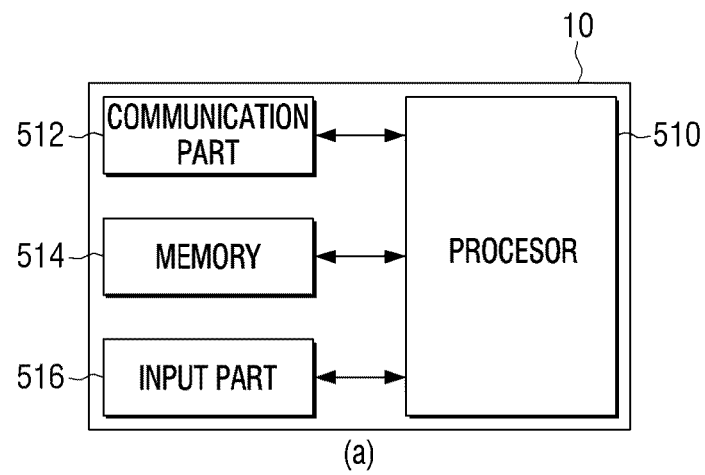
(a)
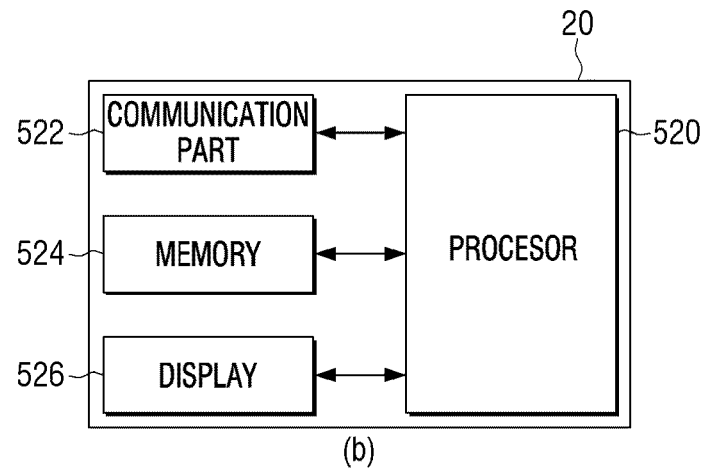
(b)
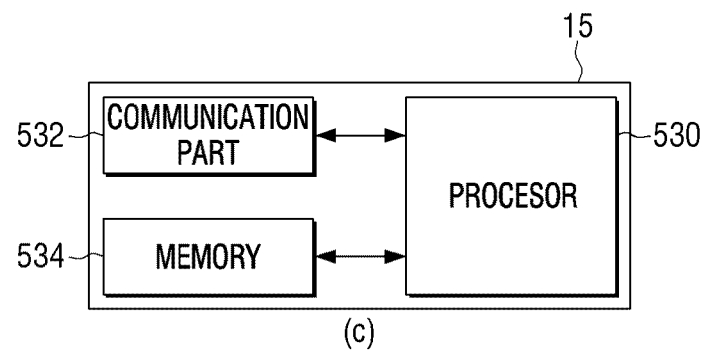
(c)

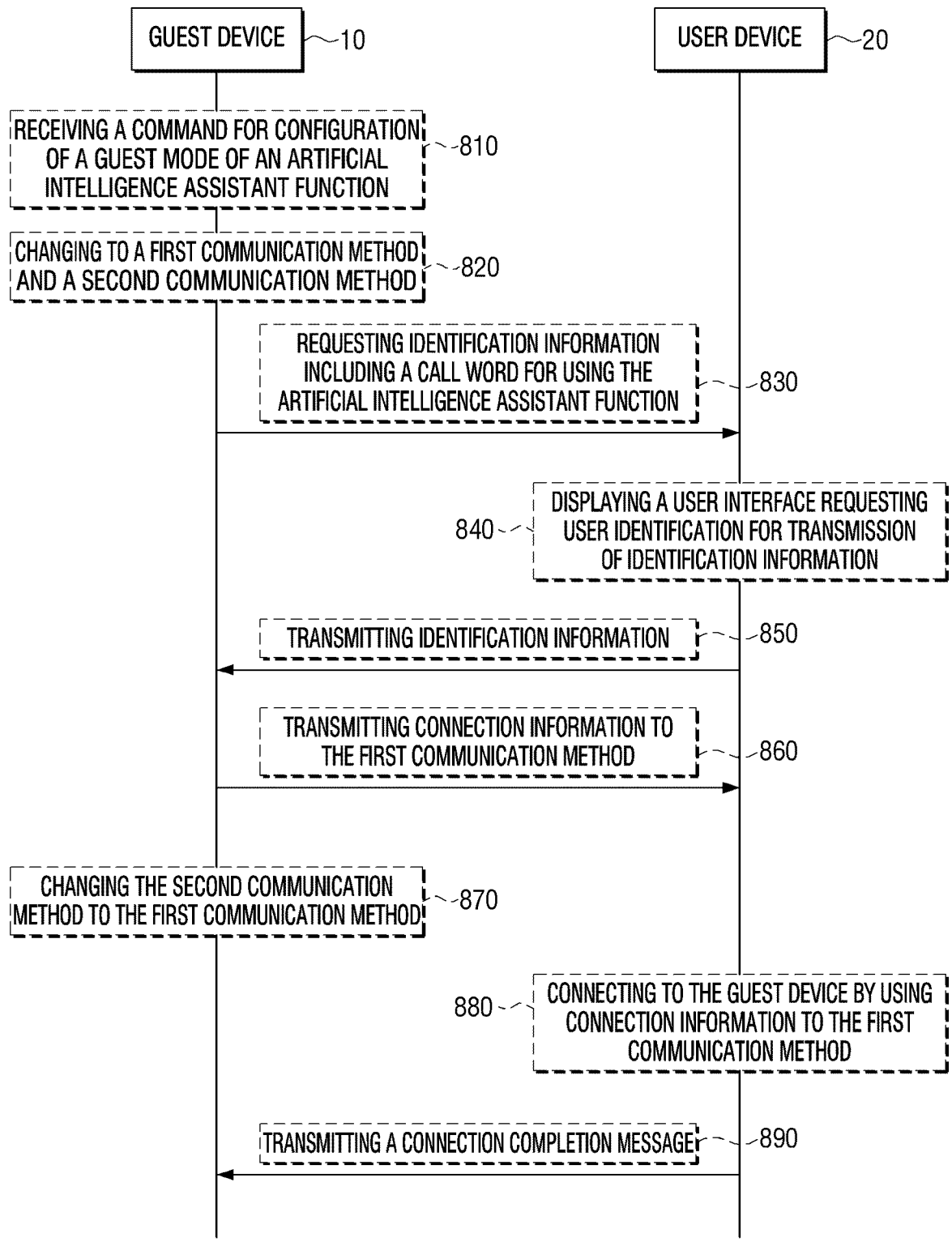

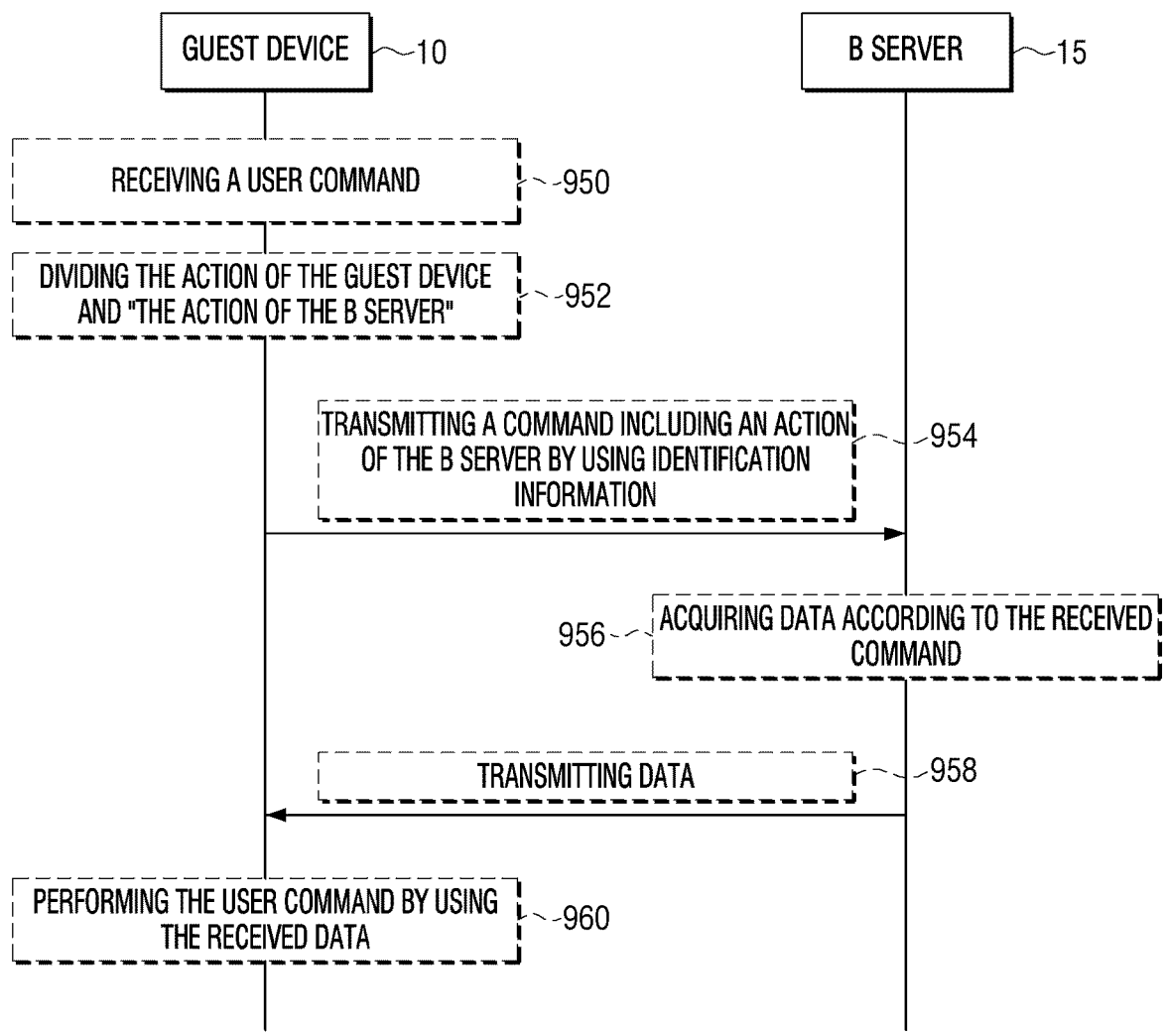

ELECTRONIC DEVICE AND CONTROL METHOD THEREFOR

CROSS-REFERENCE TO RELATED APPLICATIONS

This application is a continuation of U.S. application Ser. No. 16/629,399, filed Jan. 8, 2020, which is the U.S. national phase of International Application No. PCT/KR2018/010921, filed Sep. 17, 2018, which designated the U.S. and claims priorities to U.S. Provisional Patent Application No. 62/559,095 filed Sep. 15, 2017; KR Application No. 10-2017-0156173 filed Nov. 22, 2017; and KR Application No. 10-2018-0109849 filed Sep. 13, 2018, the entire contents of each of which are hereby incorporated by reference.

BACKGROUND

1. Field

The disclosure relates to a method for utilizing an artificial intelligence assistant, and more particularly, to an electronic device which provides a guest mode of using an artificial intelligence assistant function in an external device and a control method therefor.

2. Description of Related Art

In addition to a traditional input method using a keyboard or a mouse, recent electronic devices can support various input methods such as voice input. For example, electronic devices such as a smartphone, a tablet, and an artificial intelligence speaker can recognize a user voice input while a voice recognition service is executed, and execute an operation or provide a search result corresponding to the voice input.

A voice recognition function is developing based on a technology of processing a natural language. A technology of processing a natural language is a technology of identifying the intent of a user utterance, and providing a result that suits the intent to a user.

Recently, various companies are providing an artificial intelligence assistant function based on such a voice recognition function.

An artificial intelligence system is a system wherein a machine learns, determines, and becomes smarter by itself, unlike conventional rule-based smart systems. An artificial intelligence system shows a more improved recognition rate as it is used more, and becomes capable of understanding user preference more correctly. For this reason, conventional rule-based smart systems are gradually being replaced by deep learning-based artificial intelligence systems.

An artificial intelligence technology consists of machine learning (for example, deep learning) and element technologies utilizing machine learning.

Machine learning refers to an algorithm technology of classifying/learning the characteristics of input data by itself, and an element technology refers to a technology of simulating functions of a human brain such as cognition and determination by using a machine learning algorithm such as deep learning, and includes fields of technologies such as linguistic understanding, visual understanding, inference/prediction, knowledge representation, and operation control.

Examples of various fields to which artificial intelligence technologies are applied are as follows. Linguistic understanding refers to a technology of recognizing languages/characters of humans, and applying/processing them, and includes natural speech processing, machine translation, communication systems, queries and answers, voice recognition/synthesis, and the like. Visual understanding refers to a technology of recognizing an object in a similar manner to human vision, and processing the object, and includes recognition of an object, tracking of an object, search of an image, recognition of humans, understanding of a scene, understanding of a space, improvement of an image, and the like. Inference/prediction refers to a technology of determining information and then making logical inference and prediction, and includes knowledge/probability based inference, optimization prediction, preference based planning, recommendation, and the like. Knowledge representation refers to a technology of automatically processing information of human experiences into knowledge data, and includes knowledge construction (data generation/classification), knowledge management (data utilization), and the like. Operation control refers to a technology of controlling autonomous driving of vehicles and movements of robots, and includes movement control (navigation, collision, driving), operation control (behavior control), and the like.

SUMMARY

A conventional artificial intelligence assistant function can be performed at a device which a user previously registered. Accordingly, there is inconvenience that a user cannot use an artificial intelligence assistant function that is fitted to the user by continuous use at a device that the user did not set previously or a device of another person.

Also, there is inconvenience that a user cannot use an artificial intelligence assistant function of the user at a device which uses an artificial intelligence assistant function different from the artificial intelligence assistant function that the user uses.

The disclosure suggests a method by which a user can use an artificial intelligence assistant function that the user previously used at a device that the user did not set previously or a device of another person. Also, the disclosure aims to suggest a method by which a user can use an artificial intelligence assistant function of the user at a device which provides an artificial intelligence assistant different from the artificial intelligence assistant that the user uses.

An electronic device according to an embodiment of the disclosure includes an input part, a communication part, a processor, and a memory, wherein the memory may include instructions for controlling the communication part such that the processor requests, and based on an event for requesting configuration of a first mode in which an artificial intelligence assistant function of another electronic device can be used occurring, requests identification information including a call word for using the artificial intelligence assistant function to the other electronic device, and to receive the identification information from the other electronic device through the communication part in response to the request, and based on a user command being received during operation of the first mode of the artificial intelligence assistant, to transmit the user command to the other electronic device based on the identification information.

Also, an electronic device according to an embodiment of the disclosure includes a display, a communication part, a processor, and a memory, wherein the memory may include instructions for controlling the communication part such that the processor, and based on a signal for requesting transmission of identification information including a call word for using an artificial intelligence assistant function being received through the communication part, controls the display to display a user interface for requesting user identification for transmission of the identification information, and to transmit the identification information to another electronic device as a result of user identification through the user interface.

A control method for an electronic device according to an embodiment of the disclosure may include the steps of detecting occurrence of an event for requesting configuration of a first mode wherein an artificial intelligence assistant function of another electronic device can be used, and based on detecting occurrence of the event for requesting configuration of the first mode, requesting identification information including a call word for using the artificial intelligence assistant function to the other electronic device, receiving the identification information from the other electronic device in response to the request, and based on a user command being received during operation of the first mode of the artificial intelligence assistant, transmitting a user command to the other electronic device based on the identification information.

Also, a control method for an electronic device according to an embodiment of the disclosure may include the steps of receiving a signal for requesting transmission of identification information including a call word for using an artificial intelligence assistant function, and based on the signal being received, displaying a user interface for requesting user identification for transmission of the identification information on the display, and transmitting the identification information to another electronic device as a result of the user identification.

A computer program product according to an embodiment of the disclosure may include a recording medium storing instructions configured to perform the operations of detecting occurrence of an event for requesting configuration of a first mode wherein an artificial intelligence assistant function of another electronic device can be used, and based on detecting occurrence of the event for requesting configuration of the first mode, requesting identification information including a call word for using the artificial intelligence assistant function to the other electronic device, receiving the identification information from the other electronic device in response to the request, and based on a user command being received during operation of the first mode of the artificial intelligence assistant, transmitting a user command to the other electronic device based on the identification information.

Also, a computer program product according to an embodiment of the disclosure may include a recording medium storing instructions configured to perform the operations of receiving a signal for requesting transmission of identification information including a call word for using an artificial intelligence assistant function, and based on the signal being received, displaying a user interface for requesting user identification for transmission of the identification information on the display, and transmitting the identification information to another electronic device as a result of the user identification.

According to the various embodiments of the disclosure, a user becomes capable of using an artificial intelligence assistant function that the user uses at a device providing a different artificial intelligence assistant function.

Also, according to the various embodiment of the disclosure, a user becomes capable of using an artificial intelligence assistant function that is fitted to the user at an external device which is not the device of which artificial intelligence assistant function was used by the user.

BRIEF DESCRIPTION OF THE DRAWINGS

FIG. 5 is a schematic block diagram of a guest device, a user device, and a server according to an embodiment of the disclosure;

FIG. 8 is a flow chart illustrating a method for executing a guest mode of an artificial intelligence assistant function according to an embodiment of the disclosure;

FIG. 9C is a diagram for illustrating another situation wherein a guest mode of an artificial intelligence assistant is utilized by using a server according to an embodiment of the disclosure;

DETAILED DESCRIPTION

Figure 1A:
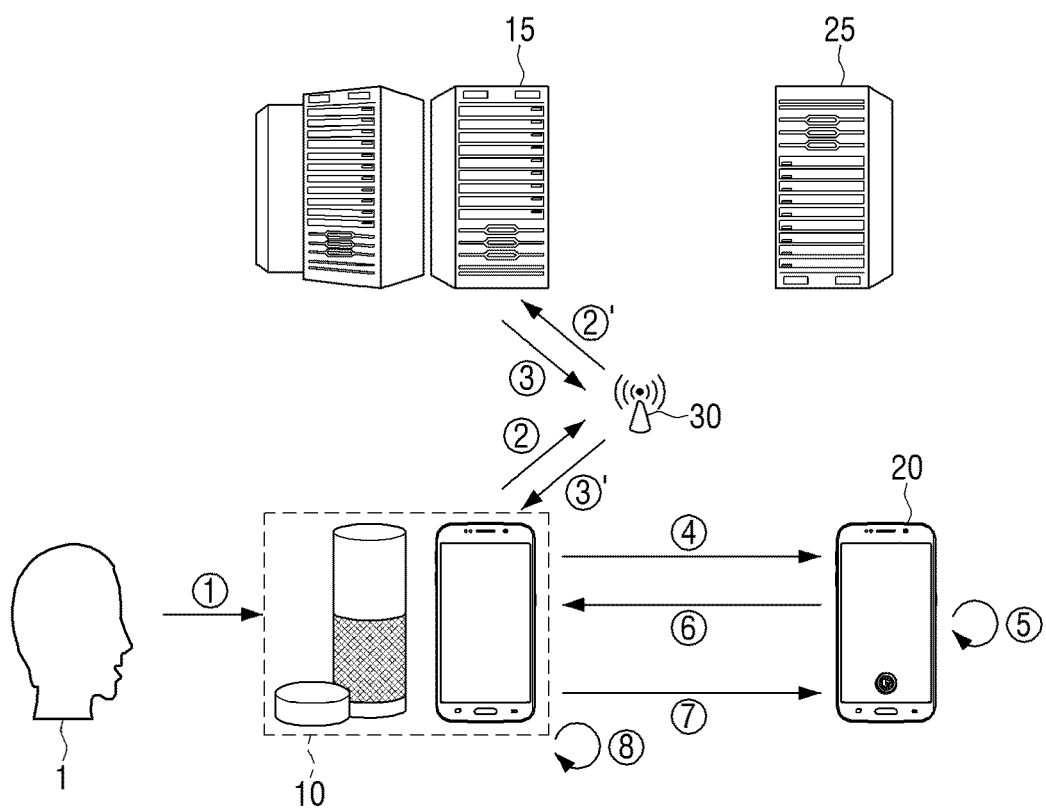
FIG. 1A is a diagram for illustrating a process of setting a guest mode included in an artificial intelligence assistant function according to an embodiment of the disclosure.

An electronic device according to the various embodiments described in the disclosure may be devices in various forms. An electronic device may include, for example, at least one of a portable communication device (e.g.: a smartphone), a computer device, a portable multimedia device, a portable medical device, a camera, a wearable device, or household appliances. However, an electronic device according to the embodiments of the disclosure is not limited to the aforementioned devices.

The various embodiments of the disclosure and the terms used in the embodiments are not for limiting the technology described in the disclosure to a specific embodiment, but they should be interpreted to include various modifications, equivalents and/or alternatives of the embodiments. Meanwhile, with respect to the detailed description of the drawings, similar components may be designated by similar reference numerals. Also, singular expressions may include plural expressions, unless defined obviously differently in the context. In addition, in the disclosure, the expressions "A or B," "at least one of A and/or B," "A, B or C" or "at least one of A, B and/or C" and the like may include all possible combinations of the listed items. Also, expressions such as "first," "second" and the like may be used to describe various elements regardless of any order and/or degree of importance, and are used only to distinguish one element from another element, and are not intended to limit the elements. Further, the description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element).

Hereinafter, various embodiments of the disclosure will be described with reference to the accompanying drawings.

FIG. 1A is a diagram for illustrating a process of setting a guest mode included in an artificial intelligence assistant function according to an embodiment of the disclosure.

An artificial intelligence assistant function according to an embodiment of the disclosure may be implemented by using an electronic device including at least one of a guest mode provision device (hereinafter, referred to as a guest device) 10 or a user device 20 and at least one server 15, 25. The server 15, 25 may include a cloud server. However, the disclosure is not limited thereto.

The electronic device may include at least one of the guest device 10 or the user device 20. Also, the electronic device may provide a function or a service necessary for a user through an app (or, an application program) (e.g., a notification app, a message app, a gallery app, etc.) stored inside the electronic device.

For example, the electronic device may execute and operate another app through an intelligent app such as a voice recognition app stored inside the electronic device. Also, the electronic device may receive a user input for operating an intelligent app such as a voice recognition app.

A user input may be received, for example, through a physical button, a touch pad, a voice input, a remote input, etc.

According to an embodiment of the disclosure, the electronic device may include various types of devices that can be connected to the Internet such as a mobile phone, a smartphone, a personal digital assistant (PDA), an artificial intelligence (AI) speaker, or a laptop computer, etc.

Also, according to an embodiment of the disclosure, the electronic device may receive a user utterance as a user input. The electronic device may receive a user utterance and generate a command for operating an app based on the user utterance. Accordingly, the electronic device may operate various apps by using the generated command.

In addition, according to an embodiment of the disclosure, the server 15, 25 may receive input of a user voice from the electronic device through a third device 30 and change the voice into text data. The third device may be, for example, at least one of an access point (AP), a repeater, a share device, a gateway, or a hub.

According to the various embodiments of the disclosure, there may be a plurality of servers 15, 25. For example, the A server 15 may be a platform or the server of the manufacturer supporting the A artificial intelligence assistant function, and the B server 25 may be a platform or the server of the manufacturer supporting the B artificial intelligence assistant function. However, the disclosure is not limited thereto. For example, the A artificial intelligence assistant function and the B artificial intelligence assistant function may be implemented by using a plurality of servers.

Also, according to the various embodiments of the disclosure, the server 15, 25 may generate (or, select) a path rule based on text data. The path rule may include information on an action (or an operation) for performing the function of an app or information on a parameter necessary for executing an action. Also, the path rule may include the order of the action of an app. The electronic device may receive the path rule, select an app according to the path rule, and execute the action included in the path rule in the selected app.

According to an embodiment of the disclosure, the server 15, 25 may include a database wherein user information is stored. The server 15, 25 may receive user information (e.g., context information, app execution information, etc.) from the electronic device and store the information in the database. Also, the server 15, 25 may use the information included in the database in the case of generating a path rule for a user input.

Also, according to an embodiment of the disclosure, the server 15, 25 may include a database wherein introduction of a function or an app stored in the electronic device or information on a function to be provided is stored. For example, the server 15, 25 may generate a database for a function that a user can use by using the user information. The electronic device may receive information on a function that can be provided from the server 15, 25 through a communication network and provide the information to the user.

According to the various embodiments of the disclosure, the server 15, 25 or the electronic device may include a recognition model improving the recognition ability through learning such as a natural language understanding module, a natural language generation module, etc. In this case, the recognition model may be a model trained by using an artificial intelligence algorithm such as a machine learning, neural network or deep learning algorithm. In this case, the artificial intelligence algorithm may be used in the aforementioned process of recognizing a user utterance and changing the utterance into text data. Explanation in this regard will be made later with reference to FIG. 12.

Hereinafter, a method for setting a guest mode included in an artificial intelligence assistant function will be described with reference to FIG. 1A.

A first mode (e.g., a guest mode) of an artificial intelligence assistant function may mean, for example, a mode wherein an artificial intelligence assistant function used at an electronic device owned by a user is performed by using another electronic device which is not the electronic device owned by the user. That is, the first mode may mean a mode wherein an artificial intelligence assistant function used at a user device 20 is used by controlling the user device 20 at a guest device 10 which is not owned by the user.

In this case, the guest device 10 and the user device 20 may use artificial intelligence assistant functions different from each other. For example, the guest device 10 may use the A artificial intelligence assistant function interlocked with the A server 15, and the user device 20 may use the B artificial intelligence assistant function interlocked with the B server 25.

That is, the user may use the B artificial intelligence assistant function used at the user device 20 at the guest device 10 by using a guest mode. According to the various embodiments of the disclosure, the A server 15 may be a server generated at the A manufacturer or the A platform, and the B server 25 may be a server generated at the B manufacturer or the B platform.

According to an embodiment of the disclosure, the guest device 10 may receive information related to the data that a user used an artificial intelligence assistant function or voice assistant data fitted to a user through the user's use from the user device 20 or the B server 25 connected to the user device 20 through a communication network.

In the action ①, the guest device 10 may receive a command for requesting configuration of a guest mode from a user 1. For example, the user 1 may make an utterance for requesting configuration of a guest mode. Also, the guest device 10 may receive the utterance of the user 1, and recognize the content included in the utterance by using an intelligent app such as a voice recognition app.

According to the various embodiments of the disclosure, the guest device 10 may identify the content included in a command received from the user 1 by using the A server 15.

For example, in the action ②, the guest device 10 may transmit a received command to the third device 30. Also, in the action ②, the A server 15 may receive the command of the user 1. The A server 15 may receive a user utterance and recognize the content of the utterance by using an intelligent program such as a voice recognition program. According to the various embodiments of the disclosure, the guest device 10 and the server 15, 20 may directly form a network without using the third device 30.

In the action ③, the A server 15 may transmit the content of the utterance to the third device 30. Also, in the action ③', the guest device 10 may receive the content of the utterance for requesting configuration of a guest mode.

According to the various embodiments of the disclosure, in case the guest device 10 recognizes an utterance of the user 1 by using an intelligent app such as a voice recognition app, the actions ②, ②', ③, and ③' may be omitted.

In the action ④, the guest device 10 may prepare configuration of a guest mode. For example, the guest device 10 may generate an identification signal for searching a communicable device located nearby by executing a wi-fi direct or ad-hoc function and transmit the signal. Here, the device located nearby may be the user device 20. That is, the guest device 10 may request identification information for using an artificial intelligence assistant function used at the user device 20.

In the action ⑤, the user device 20 may receive an identification signal for requesting identification information including a call word (e.g., Bixby, Alexa, Cortana, etc.) for using an artificial intelligence assistant function from the guest device 10. In this case, the user device 20 may display a user interface for requesting identification by the user 1 for transmission of the identification information.

Identification information for using an artificial intelligence assistant function may include, for example, at least one of information of an account that can access the B artificial intelligence assistant, the name of the B artificial intelligence assistant, the name of the manufacturer providing the B artificial intelligence assistant, information of the uniform resource locator (URL) of the B artificial intelligence assistant, or the platform providing the B artificial intelligence assistant.

Here, in case the identification information is the name of the B artificial intelligence assistant, the manufacturer of the B artificial intelligence assistant, information of the uniform resource locator (URL) of the B artificial intelligence assistant, or the platform providing the B artificial intelligence assistant, the guest device 10 may store a call word of the artificial intelligence assistant corresponding to the name of the B artificial intelligence assistant, the manufacturer of the B artificial intelligence assistant, information of the uniform resource locator (URL) of the B artificial intelligence assistant, or the platform providing the B artificial intelligence assistant.

In the action ⑥, in case there is identification by the user 1 for transmission of the identification information, the user device 20 may transmit the identification information to the guest device 10.

In the action ⑦, in case the identification information is received from the user device 20, the guest device 10 may transmit information that can be connected to the third device 30 to the user device 20. For example, in case the guest device 10 and the third device 30 established a communication network by using wireless fidelity (wi-fi), an interface between the guest device 10 and the user device 20 may be defined by using an option field included in a wired/wireless local area network (LAN) frame.

According to an embodiment of the disclosure, the guest device 10 and the user device 20 may define an interface based on a natural language. For example, the guest device 10 and the user device 20 may transmit and receive a voice input from a user in the form of a file. Also, the guest device 10 and the user device 20 may convert a voice into the form of a structured text (e.g., a comma separated value (CSV), an extensible markup language (XML), a hypertext markup language (HTML), a Java script object notation (JSON), etc.), or convert a voice into the form of a text in a natural language form, and transmit and receive the text.

In the action ⑧, the guest device 10 may terminate the wi-fi direct or ad-hoc function, and generate a user interface notifying that the third device 30 has been accessed, and the guest mode has been executed.

For example, in case the guest device 10 is an artificial intelligence (AI) speaker, the guest device 10 may notify the beginning of the guest mode to a user as a voice. Meanwhile, in case the guest device 10 is a smartphone or a tablet PC, the guest device 10 may display a user interface notifying the beginning of the guest mode on a display, etc.

Meanwhile, in the aforementioned embodiment, it was described that a user command (e.g., a user utterance) for requesting configuration of a guest mode is received for entering a guest mode. However, this is merely an example, and in case the guest device 10 accesses a network system (e.g., a home network system) included in the user device 20, the guest device 10 may enter a guest mode.

Figure 1B:
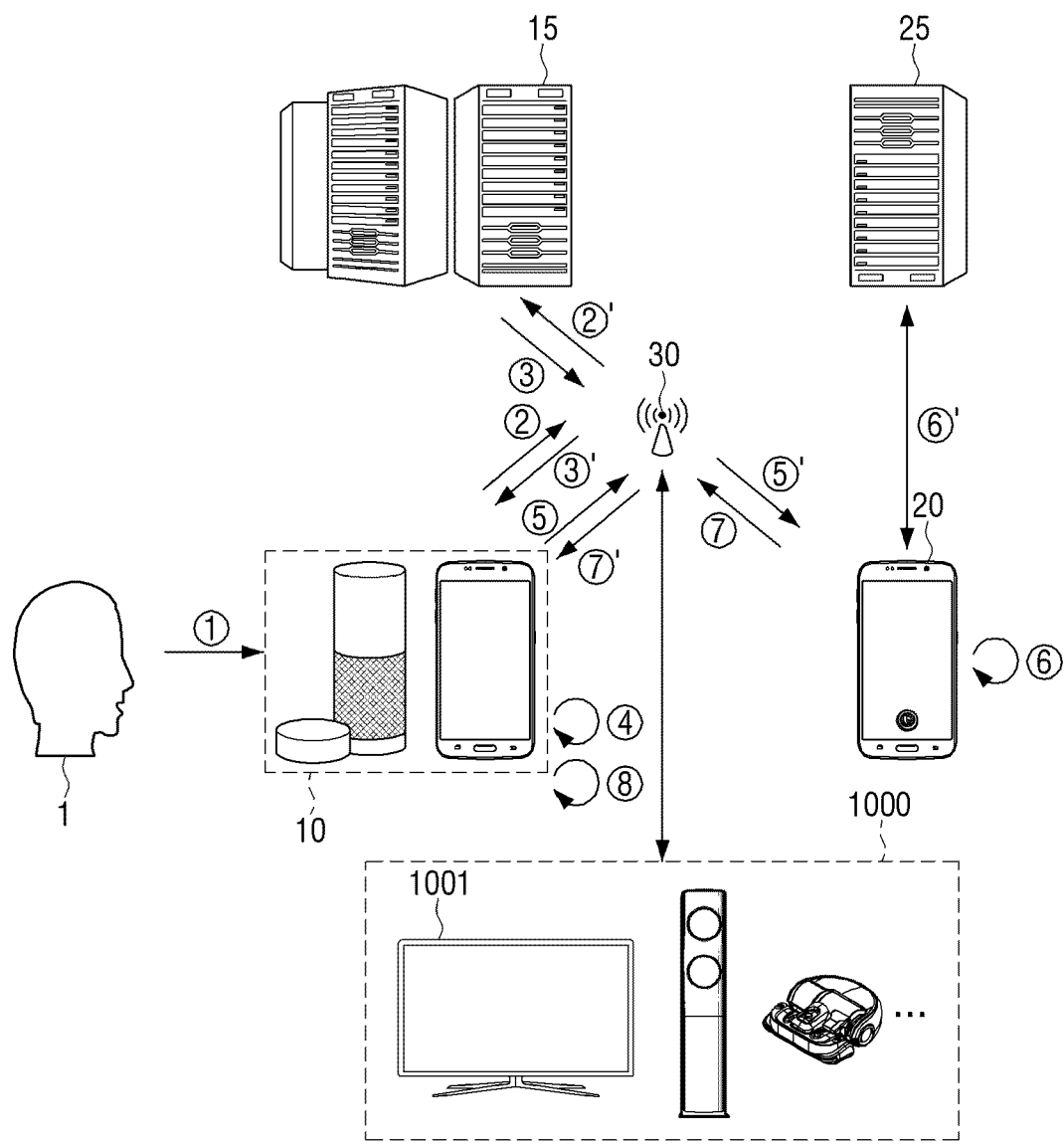
FIG. 1B is a diagram for illustrating a situation wherein a guest mode of an artificial intelligence assistant is utilized by using a user device according to an embodiment of the disclosure.

FIG. 1B is a diagram for illustrating a situation wherein a guest mode of an artificial intelligence assistant is utilized by using a user device according to an embodiment of the disclosure.

In the action ①, the guest device 10 may receive a command of the user 1 wishing to play music by using the B artificial intelligence assistant function. Hereinafter, explanation will be made based on the assumption that the call word of the B artificial intelligence assistant is "Bixby." The command of the user 1 may be, for example, "Bixby, continue playing the album of the singer I listened to yesterday." Then, the guest device 10 may receive the utterance of the user 1, and recognize the content included in the received utterance by using an intelligent app such as a voice recognition app.

According to the various embodiments of the disclosure, the guest device 10 may identify the content included in a command received from the user 1 by using the A server 15.

For example, in the action ②, the guest device 10 may transmit the received command to the third device 30. Also, in the action ②', the A server 15 may receive a command of the user 1. The A server 15 may receive the utterance of the user 1, and recognize the content of the utterance by using an intelligent program such as a voice recognition program.

In the action ③, the A server 15 may transmit the content of the utterance to the third device 30. Also, in the action ③', the guest device 10 may receive the content of the utterance wishing to play music.

According to the various embodiments of the disclosure, in case the guest device 10 recognizes an utterance of the user 1 by using an intelligent app such as a voice recognition app, the actions ②, ②', ③, and ③' may be omitted.

In the action ④, the guest device 10 may divide the command of the user 1 into an action to be performed by the guest device 10 and an action to be performed by the user device 20. For example, the guest device 10 may determine that playing music is the action of the guest device 10, and acquiring a music file (e.g.: the music file in the album of the singer which the user listened to yesterday) is the action of the user device 20.

In the action ⑤, the guest device 10 may request the user device 20 to transmit to the user the music file of the album of the singer which the user listened to yesterday. For example, the guest device 10 may transmit a text based on a natural language such as "Bixby, transmit the music file in the album of the singer I listened to yesterday" to the third device 30 by using the identification information (e.g., Bixby which is the call word of the B artificial intelligence assistant) received from the user device 20. According to another embodiment of the disclosure, the guest device 10 may transmit an input voice which is not a text based on a natural language directly to the user device 20 in the form of a file according to an interface defined between the guest device 10 and the user device 20, or change an input voice into a structured text corresponding to the B artificial intelligence assistant function and transmit the text to the user device 20.

According to the various embodiments of the disclosure, in case identification information is not "Bixby," but the name of the B artificial intelligence assistant, the manufacturer of the B artificial intelligence assistant, information of the uniform resource locator (URL) of the B artificial intelligence assistant, or the platform providing the B artificial intelligence assistant, the guest device 10 may perform the same action as the action ⑤ by using "Bixby" which is a call word stored correspondingly to the name of the B artificial intelligence assistant, the manufacturer of the B artificial intelligence assistant, information of the uniform resource locator (URL) of the B artificial intelligence assistant, or the platform providing the B artificial intelligence assistant.

In the action ⑤, the user device 20 may receive a request of the guest device 10 which is "Bixby, transmit the music file in the album of the singer I listened to yesterday" from the third device 30.

In the action ⑥, the user device 20 may search a music file corresponding to the request of the guest device 10 (e.g., the music file in the album of the singer which the user listened to yesterday). Also, in the action ⑥, in case a music file corresponding to the request of the guest device 10 (e.g., the music file in the album of the singer which the user listened to yesterday) does not exist in the user device 20, the user device 20 may request transmission of a music file corresponding to the request of the guest device 10 (e.g., the music file in the album of the singer which the user listened to yesterday) to the B server 25 connected through a communication network and receive the file.

In the action ⑦, the user device 20 may transmit the received music file (e.g., the music file in the album of the singer which the user listened to yesterday) to the third device 30.

Also, in the action ⑦, the guest device 10 may receive the music file (e.g., the music file in the album of the singer which the user listened to yesterday) transmitted from the third device 30.

In the action ⑧, the guest device 10 may execute a music play application, and play the received music file (e.g., the music file in the album of the singer which the user listened to yesterday).

According to the various embodiments of the disclosure, the user 1 may control various home appliances 1000 connected to a network by using a guest mode.

For example, the guest device 10 may receive a command of the user 1 which is "Turn on the TV and show me channel No. 1." The guest device 10 may transmit the received command to the user device 20. Then, the user device 20 may control a TV 1001 connected to a network according to the received command and turn on the TV, and change the channel to No. 1.

Figure 1C:
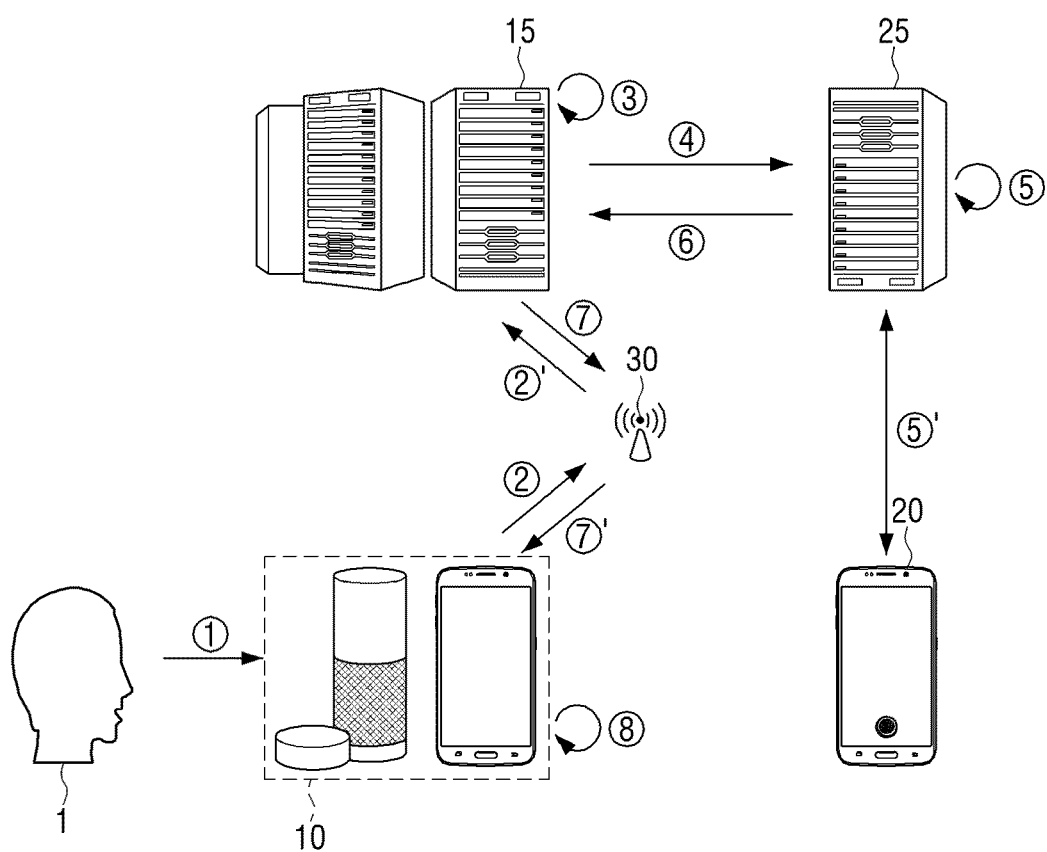
FIG. 1C is a diagram for illustrating a situation wherein a guest mode of an artificial intelligence assistant is utilized by using a server according to an embodiment of the disclosure.

FIG. 1C is a diagram for illustrating a situation wherein a guest mode of an artificial intelligence assistant is utilized by using a server according to an embodiment of the disclosure.

For example, the situation may be a situation wherein the B artificial intelligence assistant function provided by the B server 25 is utilized as a guest mode through the A server 15 used by the guest device 10.

In the action ①, the guest device 10 may receive a command of the user 1 wishing to play music by using the B artificial intelligence assistant function. Hereinafter, explanation will be made based on the assumption that the call word of the B artificial intelligence assistant function is "Bixby." The command of the user 1 may be, for example, "Bixby, play the album I listened to the most." The guest device 10 may receive the utterance of the user 1, and recognize the content included in the received utterance by using an intelligent app such as a voice recognition app.

According to the various embodiments of the disclosure, the guest device 10 may transmit the content included in the command received from the user 1 to the A server 15, and the content may be identified by using a voice recognition algorithm, etc. included in the A server 15.

In the action ②, the guest device 10 may transmit the received command to the third device 30 in the form of a voice file. Also, in the action ②, the A server 15 may receive the command of the user 1 from the third device 30.

In the action ③, the A server 15 may divide the command of the user 1 into an action to be performed by the guest device 10 and an action to be performed by the B server 25. For example, the A server 15 may determine that playing music is the action of the guest device 10, and acquiring a music file (e.g.: the music file in the album which the user listened to the most) is the action of the B server 25.

In the action ④, the A server 15 may request the B server 25 to transmit the music file in "the album which the user listened to the most." For example, the A server 15 may transmit to the B server 25 a text based on a natural language such as "Bixby, transmit the music file in the album I listened to the most" by using the identification information received from the user device 20 (e.g., Bixby which is the call word of the B artificial intelligence Assistant), as described with reference to FIG. 1A above. According to another embodiment of the disclosure, the A server 15 may transmit an input voice which is not a text based on a natural language directly to the B server 25 in the form of a file according to an interface defined between the A server 15 and the B server 25, or change an input voice into a structured text corresponding to the B artificial intelligence assistant function and transmit the text to the B server 25.

In the action ⑤, the B server 25 may search a music file corresponding to the request of the A server 15 (e.g., the music file included in the album which the user listened to the most). Also, in the action ⑤, in case a music file corresponding to the request of the A server 15 (e.g., the music file included the album which the user listened to the most) does not exist in the B server 25, the B server 25 may request transmission of a music file corresponding to the request of the A server 15 (e.g., the music file included in the album which the user listened to the most) to the user device 20 connected through a communication network and receive the file.

In the action ⑥, the B server 25 may transmit the received music file (e.g., the music file included in the album which the user listened to the most) to the A server 15.

In the action ⑦, the A server 15 may transmit the received music file (e.g., the music file included in the album which the user listened to the most) to the third device 30. Also, the A server 15 may order the guest device 10 to execute a music play application. In addition, in the action ⑦, the guest device 10 may receive the received music file (e.g., the music file included in the album which the user listened to the most) and a command from the third device 30.

In the action ⑧, the guest device 10 may execute a music play application, and play the received music file (e.g., the music file included in the album which the user listened to the most).

Figure 1D:
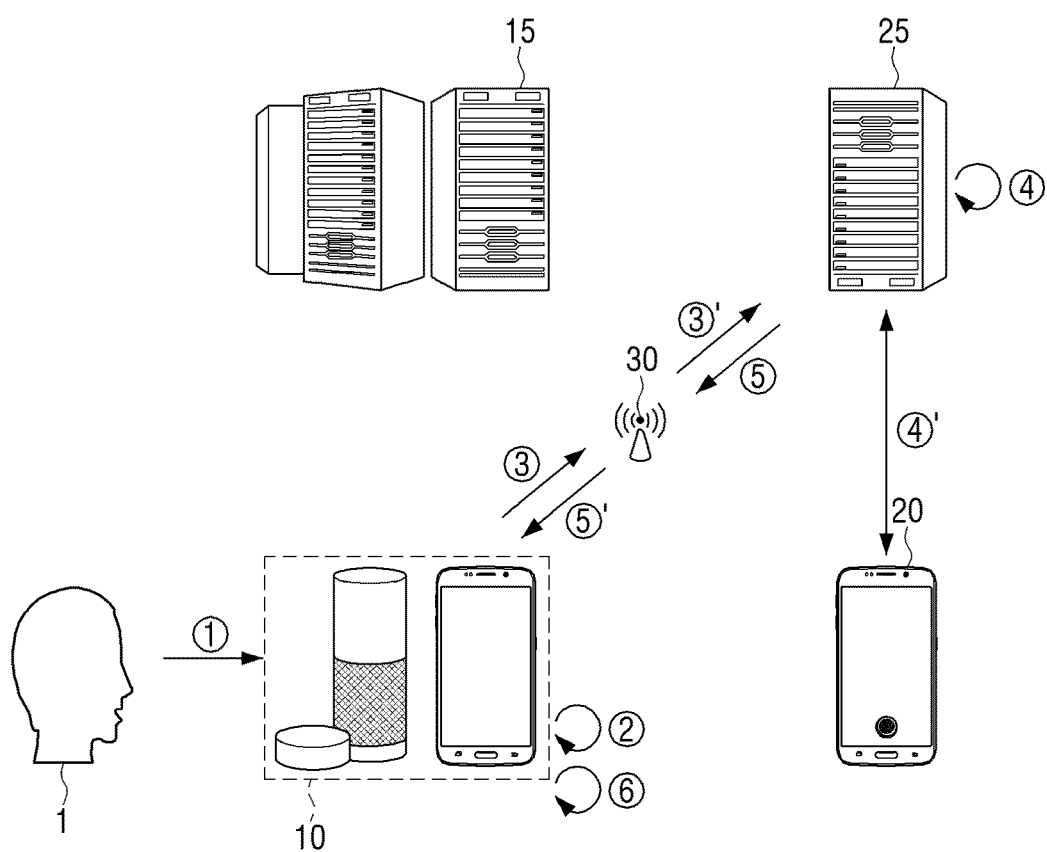
FIG. 1D is a diagram for illustrating another situation wherein a guest mode of an artificial intelligence assistant is utilized by using a server according to an embodiment of the disclosure.

FIG. 1D is a diagram for illustrating another situation wherein a guest mode of an artificial intelligence assistant is utilized by using a server according to an embodiment of the disclosure.

For example, the situation may be a situation wherein the guest device 10 utilizes the B artificial intelligence assistant function provided by the B server 25 through the B server 25 as a guest mode.

In the action ①, the guest device 10 may receive a command of the user 1 wishing to display an image by using the B artificial intelligence assistant function. Hereinafter, explanation will be made based on the assumption that the call word of the B artificial intelligence assistant is "Bixby." The command of the user 1 may be, for example, "Bixby, show me the image I photographed yesterday." Then, the guest device 10 may receive the utterance of the user 1, and recognize the content included in the received utterance by using an intelligent app such as a voice recognition app.

According to the various embodiments of the disclosure, the guest device 10 may transmit the content included in the command received from the user 1 to the A server 15, and the content may be identified by using a voice recognition algorithm, etc. included in the A server 15.

In the action ②, the guest device 10 may divide the command of the user 1 into an action to be performed by the guest device 10 and an action to be performed by the B server 25. For example, the guest device 10 may determine that displaying an image is the action of the guest device 10, and acquiring an image file (e.g.: the image photographed yesterday) is the action of the B server 25.

In the action ③, the guest device 10 may transmit a command such as "Bixby, transmit the image I photographed yesterday" to the third device 30. Also, in the action ③, the B server 25 may receive the command transmitted by the guest device 10 through the third device 30. However, the disclosure is not limited thereto, and the guest device 10 and the B server 25 may transmit and receive a command or data directly through a communication network without the third device 30.

In the action ④, the B server 25 may search an image file corresponding to the request of the guest device 10 (e.g., the image photographed yesterday). Also, in the action ④, in case an image file corresponding to the request of the guest device 10 (e.g., the image photographed yesterday) does not exist, the B server 25 may request transmission of an image file corresponding to the request of the guest device 10 (e.g., the image photographed yesterday) to the user device 20 connected through a communication network and receive the file.

In the action ⑤, the B server 25 may transmit the image file (e.g., the image photographed yesterday) to the third device 30. Also, in the action ⑤, the guest device 10 may receive the image file (e.g., the image photographed yesterday) from the third device 30.

In the action ⑥, the guest device 10 may execute an image play application, and display the received image file (e.g., the image photographed yesterday).

Figure 1E:
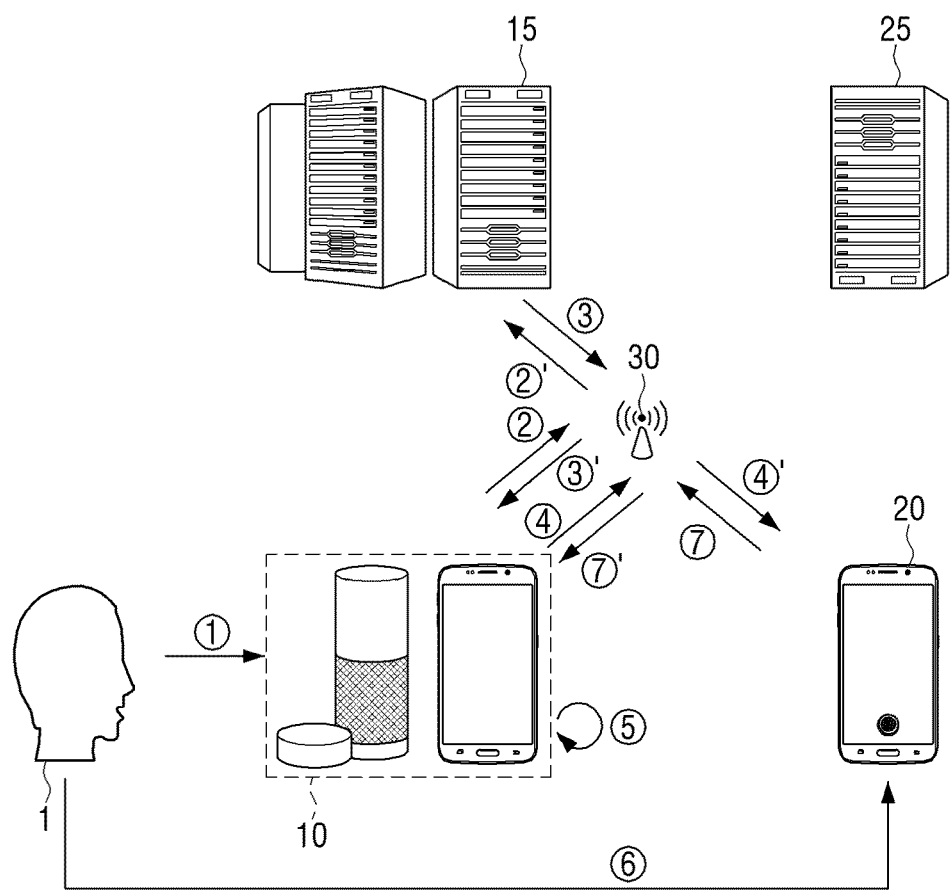
FIG. 1E is a diagram for illustrating a situation wherein a guest mode of an artificial intelligence assistant is terminated according to an embodiment of the disclosure.

FIG. 1E is a diagram for illustrating a situation wherein a guest mode of an artificial intelligence assistant is terminated according to an embodiment of the disclosure.

In the action ①, the guest device 10 may receive a command requesting termination of the guest mode from the user 1. For example, the user 1 may make an utterance requesting termination of the guest mode. Then, the guest device 10 may receive the utterance of the user 1, and recognize the content included in the utterance by using an intelligent app such as a voice recognition app.

According to the various embodiments of the disclosure, the guest device 10 may identify the content included in the command received from the user 1 by using the A server 15.

For example, in the action ②, the guest device 10 may transmit the received command to the third device 30. Also, in the action ②', the A server 15 may receive the command of the user 1. Further, the A server 15 may receive the utterance of the user 1 and recognize the content of the utterance by using an intelligent program such as a voice recognition program.

In the action ③, the A server 15 may transmit the content of the utterance to the third device 30. Also, in the action ③', the guest device 10 may receive the content of the utterance requesting termination of the guest mode.

According to the various embodiments of the disclosure, in case the guest device 10 recognizes the utterance of the user 1 by using an intelligent program such as a voice recognition program, the actions ②, ②', ③, and ③' may be omitted.

In the action ④, the guest device 10 may transmit notification about termination of the guest mode to the third device 30.

Also, in the action ④, the user device 20 may receive notification about termination of the guest mode from the third device 30.

In the action ⑤, the guest device 10 may delete all of data and identification information received from the user device 20 during operation of the guest mode of the artificial intelligence assistant function. Because of this, the user 1 may not leave information related to the user 1 in an electronic device of another person such as the guest device 10. Also, the guest device 10 may generate a user interface notifying termination of the guest mode.

According to the various embodiments of the disclosure, the user 1 may terminate the guest mode by using the user device 20.

In the action ⑥, the user device 20 may receive a command of the user 1 requesting termination of the guest mode. For example, the user 1 may make an utterance requesting termination of the guest mode. Further, the user device 20 may receive the utterance of the user 1 and recognize the content included in the utterance by using an intelligent program such as a voice recognition program.

In the action ⑦, the user device 20 may transmit notification about termination of the guest mode to the third device 30. Also, in the action ⑦, the guest device 10 may receive notification about termination of the guest mode from the third device 30. Further, the user device 20 may terminate data transmission to the guest device 10 according to the received command.

In case notification about termination of the guest mode is received, the guest device 10 may delete all of data and identification information received from the user device 20 during operation of the guest mode of the artificial intelligence assistant function. Because of this, the user 1 may not leave information related to the user 1 in an electronic device of another person such as the guest device 10.

As described above, according to an embodiment of the disclosure, the user 1 may use the artificial intelligence assistant function used at the electronic device of the user by using another electronic device which is not the electronic device that the user used. By virtue of this, the user may use an artificial intelligence assistant function optimized according to the use history at another electronic device without separate setting.

Also, according to an embodiment of the disclosure, another electronic device that supports a voice assistant guest mode may delete all received data at the time of termination of the guest mode, and thereby prevent information of a user from remaining in the another electronic device.

Meanwhile, in the aforementioned embodiment, it was described that the guest device 10 and the user device 20 use artificial intelligence assistant functions different from each other, but this is merely an example, and the guest device 10 and the user device 20 may use the same artificial intelligence assistant function. For example, both of the guest device 10 and the user device 20 may use the A artificial intelligence assistant function interlocked with the A server 15. In this case, if a command requesting configuration of the guest mode is received at the guest device 10, the guest device 10 may acquire account information of the user device 20 from the A server 15. Then, the guest device 10 may access the user device 20 based on the acquired account information of the user device 20 and control the user device 20.

Also, in the aforementioned embodiment, in case a user utterance using the call word of the B artificial intelligence assistant was input into the guest device 10, the guest device 10 transmitted the user utterance (or a text corresponding to the user utterance) to the user device 20. However, this is merely an example, and in case a user utterance using the call word of the A artificial intelligence assistant is input into the guest device 10, the guest device 10 may also transmit the user utterance (or a text corresponding to the user utterance) to the user device 20.

For example, in case the call word of the A artificial intelligence assistant is "Galaxy," and the call word of the B artificial intelligence assistant is "Bixby," a user voice which is "Galaxy, show me the image I photographed yesterday" may be input into the guest device 10. Here, the guest device 10 may receive the user utterance, and recognize the content included in the received utterance by using an intelligent app such as a voice recognition app.

The guest device 10 may divide the command of the user 1 into an action to be performed by the guest device 10 and an action to be performed by the user device 20 (or the B server 25). For example, the guest device 10 may determine that displaying an image is the action of the guest device 10, and acquiring an image file (e.g.: the image photographed yesterday) is the action of the user device 20 (or the B server 25).

Here, the guest device 10 may use the call word of the B artificial intelligence assistant function included in the identification information, for transmitting the command determined as the operation of the user device 20 (or the B server 25). For example, the guest device 10 may generate a command including the call word of the B artificial intelligence assistant function such as a text (or a structured text) like "Bixby, transmit the image I photographed yesterday," and transmit the generated command to the user device 20 (or the B server 25).

Then, the user device 20 (or the B server 25) may transmit the image photographed yesterday to the guest device 10 in response to the command received from the guest device 10.

That is, the guest device 10 may transmit a user command to the user device 20 (or the B server 25) by using the call word of the B artificial intelligence assistant function even if a user command including the call word of the B artificial intelligence assistant function is not input.

In another embodiment of the disclosure, the guest device 10 may determine an action to be performed by the user device 20 based on the call word of the B artificial intelligence assistant function included in a user utterance. For example, in case a user utterance which is "Galaxy, request Bixby to transmit the image I photographed yesterday" is received at the guest device 10, the guest device 10 may determine that the action to be performed by the B artificial intelligence assistant (i.e., the user device 20) is "transmission of the image photographed yesterday" based on "Bixby" which is the call word of the B artificial intelligence assistant included in the user utterance.

Figure 2:
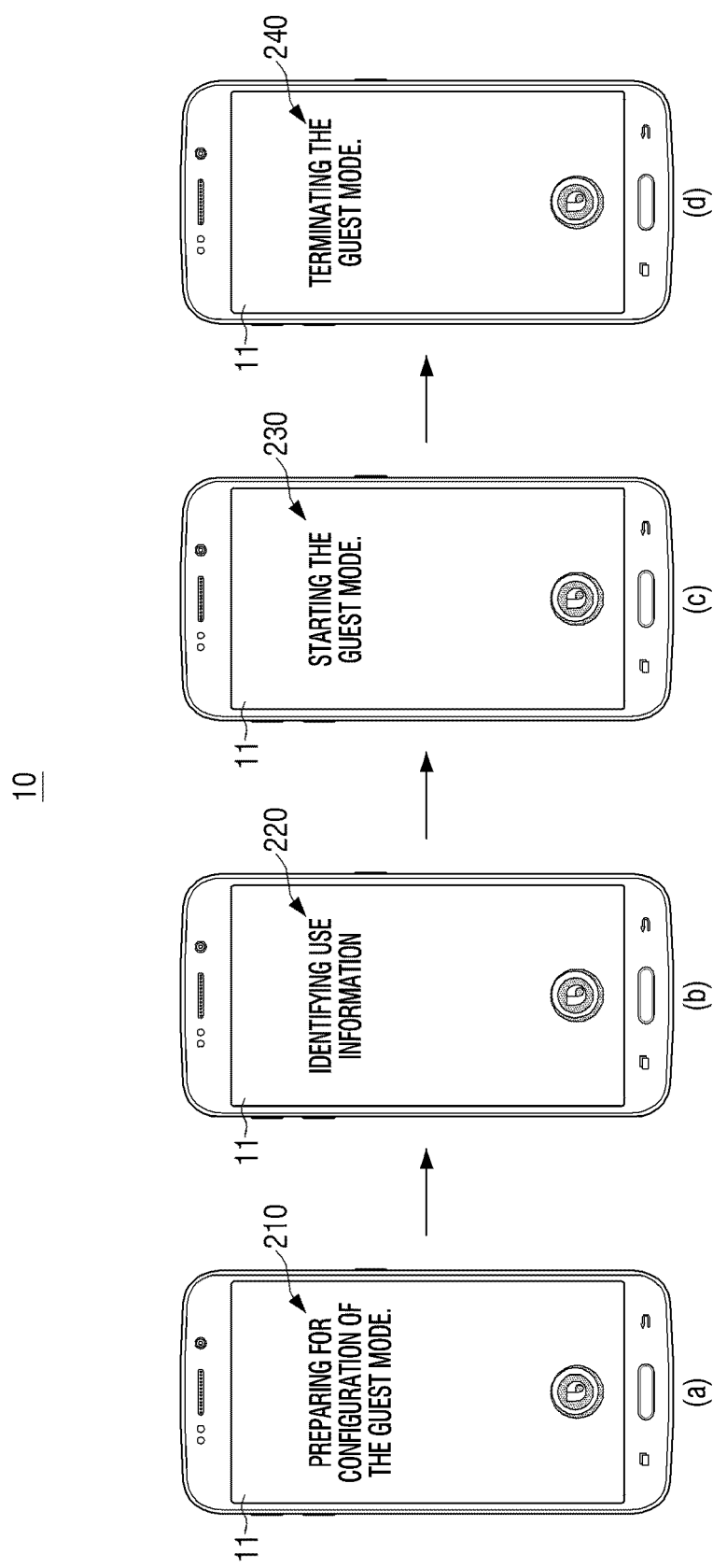
FIG. 2 are diagrams for illustrating a situation wherein a guest device generates notification notifying start and termination of a guest mode included in an artificial intelligence assistant function according to an embodiment of the disclosure.

FIG. 2 are diagrams for illustrating a situation wherein a guest device generates notification notifying start and termination of a guest mode included in an artificial intelligence assistant function according to an embodiment of the disclosure.

Referring to (a) of FIG. 2, the guest device 10 may receive a user command requesting configuration of the guest mode, and display notification which is "Preparing for configuration of the guest mode" 210.

In case the guest device 10 is an AI speaker, the guest device 10 may receive a user utterance requesting configuration of the guest mode. An AI speaker may receive a user utterance, and convert the utterance into the form of a text by using an intelligent app such as a voice recognition app, and recognize the content of the utterance requesting configuration of the guest mode.

In case the guest device 10 includes a touch screen or a physical key like a smartphone, the guest device 10 may receive a touch input or a key input of a user requesting configuration of the guest mode, and start the guest mode. However, the disclosure is not limited thereto, and a smartphone may also receive a user utterance and start the guest mode.

According to the various embodiments of the disclosure, in case the guest device 10 is an AI speaker, the guest device 10 may generate a voice which is "Preparing for configuration of the guest mode." However, the disclosure is not limited thereto, and the guest device 10 may generate light signifying the step of preparing for configuration of the guest mode by using a lighting device installed in its inside. Also, the guest device 10 may generate a sound signifying the step of preparing for configuration of the guest mode.

Referring to (b) of FIG. 2, the guest device 10 may transmit an identification signal for searching a communicable device located nearby by executing a wi-fi direct or ad-hoc function. Here, the identification signal may be, for example, a signal requesting identification information for using an artificial intelligence assistant function used at a user device.

The guest device 10 may transmit the identification signal, and during receiving identification information, may display notification which is "Identifying use information" 220 on the display 11.

According to the various embodiments of the disclosure, in case the guest device 10 is an AI speaker, the guest device 10 may generate a voice which is "Identifying use information." However, the disclosure is not limited thereto, and the guest device 10 may generate light signifying the step of identifying use information by using a lighting device installed in its inside. Also, the guest device 10 may generate a sound signifying the step of identifying use information.

Referring to (c) of FIG. 2, when the guest device 10 receives identification information from the user device, the guest device 10 may start the guest mode. For example, the guest device 10 may change the communication method to a wi-fi mode, and provide the user device with wi-fi connection information which enables access to the third device. When it is identified that the user device accessed the third device, the guest device 10 may display notification which is "Starting the guest mode" 230 on the display 11.

According to the various embodiments of the disclosure, in case the guest device 10 is an AI speaker, the guest device 10 may generate a voice which is "Starting the guest mode." However, the disclosure is not limited thereto, and the guest device 10 may generate light signifying the step of starting the guest mode by using a lighting device installed in its inside. Also, the guest device 10 may generate a sound signifying the step of starting the guest mode.

Referring to (d) of FIG. 2, when the guest device 10 receives a user command requesting termination of the guest mode, the guest device 10 may terminate the guest mode. For example, in case the guest device 10 is an AI speaker, the guest device 10 may receive a user utterance requesting termination of the guest mode. The guest device 10 may receive a user utterance, and recognize the content of the utterance by using an intelligent app such as a voice recognition app.

In case the guest device 10 includes a touch screen or a physical key like a smartphone, the guest device 10 may receive a touch input or a key input of a user requesting termination of the guest mode, and terminate the guest mode. However, the disclosure is not limited thereto, and a smartphone may also receive a user utterance and terminate the guest mode.

According to an embodiment of the disclosure, the guest device 10 may delete all data and identification information received from an external server or the user device during execution of the guest mode and stored in the guest device 10.

After deleting the data or while deleting the data, the guest device 10 may display notification which is "Terminating the guest mode" 240 on the display 11. In case the guest device 10 is an AI speaker, the guest device 10 may generate a voice which is "Terminating the guest mode." However, the disclosure is not limited thereto, and the guest device 10 may generate light signifying the step of terminating the guest mode by using a lighting device installed in its inside. Also, the guest device 10 may generate a sound signifying the step of terminating the guest mode.

Figure 3:
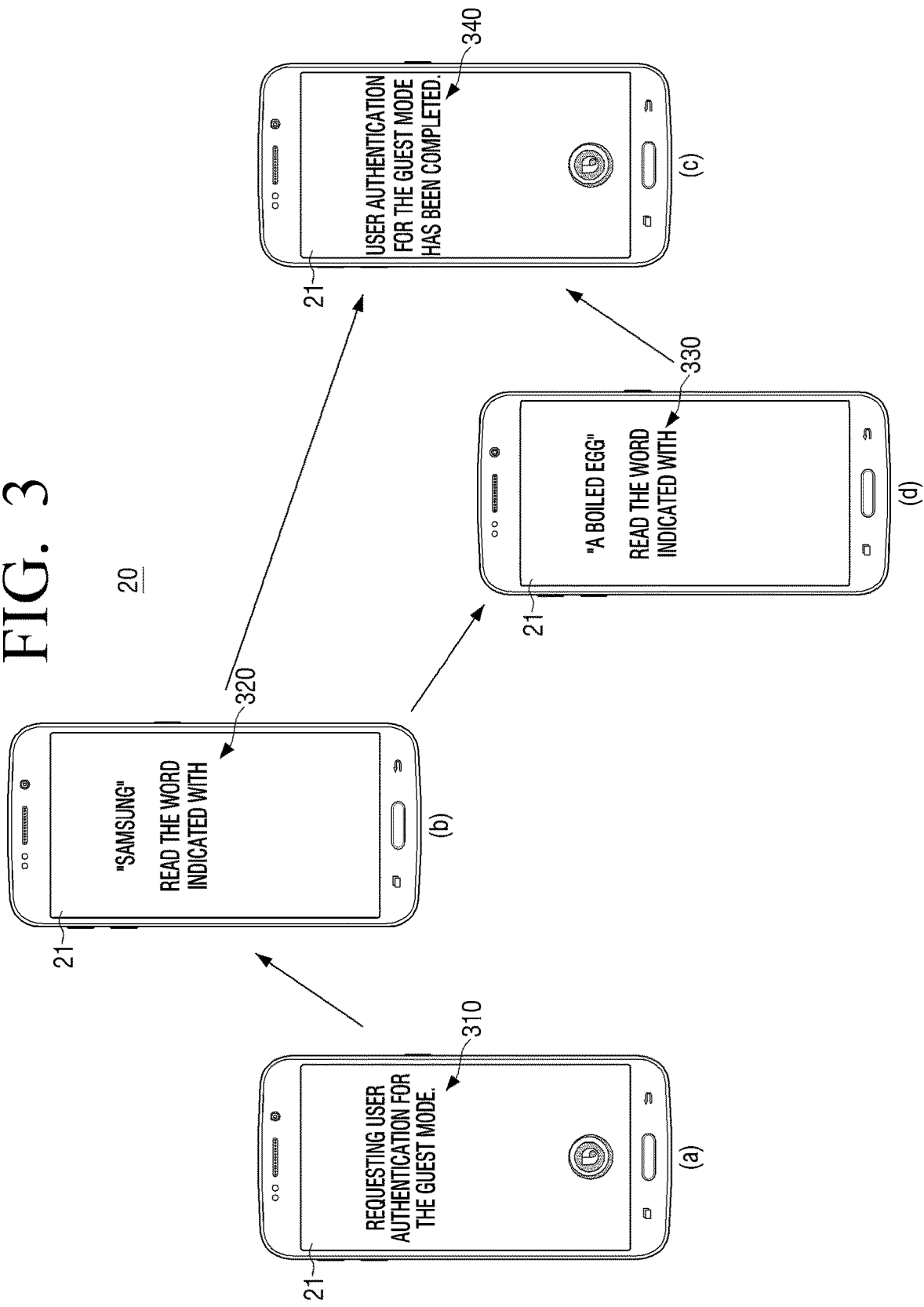
FIG. 3 are diagrams for illustrating a situation wherein a user device requests user authentication for start of a guest mode of an artificial intelligence assistant according to an embodiment of the disclosure.

FIG. 3 are diagrams for illustrating a situation wherein a user device requests user authentication for start of a guest mode of an artificial intelligence assistant according to an embodiment of the disclosure.

Referring to (a) of FIG. 3, the user device 20 may generate notification requesting user authentication for start of a guest mode. For example, when an identification signal requesting identification information for execution of a guest mode is received from the guest device, the user device 20 may display a user interface which is "Requesting user authentication for a guest mode" 310 on the display 21.

Referring to (b) of FIG. 3, the user device 20 may display a user interface requesting user utterance for user authentication for transmission of identification information. For example, the user device 20 may display a user interface which is "Read the word indicated with 'Samsung'" 320.

According to an embodiment of the disclosure, the user device 20 may receive a user utterance and analyze the voice data, and thereby identify the user. That is, the user device 20 may compare the characteristics of the voice (e.g., the tone, the intonation, etc.) that read the displayed utterance with the voice characteristics of the user accumulated while using the artificial intelligence assistant function, and identify whether the characteristics are identical.

Referring to (c) of FIG. 3, in case the characteristics of the voice that read the utterance and the characteristics of the voice accumulated while using the artificial intelligence assistant function are identical, the user device 20 may display a user interface which is "User authentication for the guest mode has been completed" 340 on the display 21.

Referring to (d) of FIG. 3, in case the characteristics of the voice that read the utterance and the characteristics of the voice accumulated while using the artificial intelligence assistant function are not identical, the user device 20 may display a user interface requesting the utterance again. In this case, the user device 20 may set a word for which the voice characteristics can be distinguished more easily than the word previously displayed. For example, the user device may display a user interface which is "Read the word indicated with 'a boiled egg'" 330.

Meanwhile, in case the characteristics of the voice that read the utterance and the characteristics of the voice accumulated while using the artificial intelligence assistant function are identical, the user device 20 may display a user interface which is "User authentication for the guest mode has been completed" 340 on the display 21, as in (c) of FIG. 3.

Figure 4:
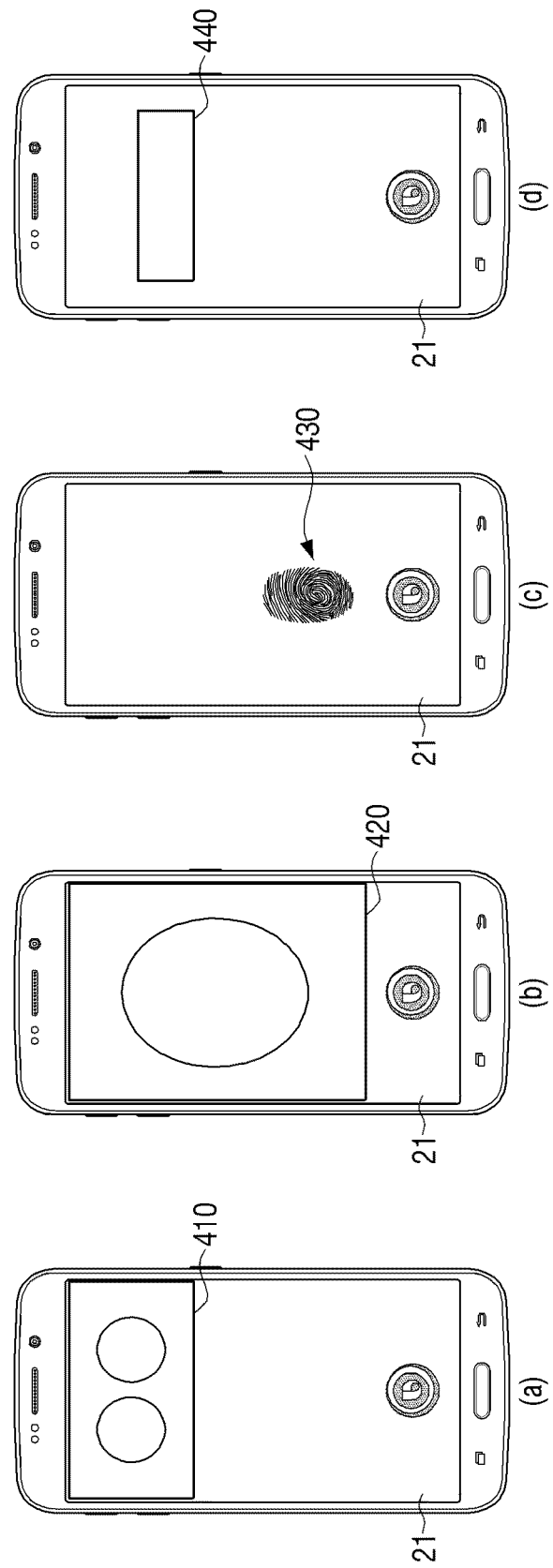
FIG. 4 are diagrams for illustrating various situations wherein a user device requests user authentication according to an embodiment of the disclosure.

FIG. 4 are diagrams for illustrating various situations wherein a user device requests user authentication according to an embodiment of the disclosure.

According to an embodiment of the disclosure, the user device 20 may proceed user identification for transmission of identification information by various methods other than recognizing an utterance.

Referring to (a) of FIG. 4 to (c) of FIG. 4, the user device 20 may display a bio recognition user interface for recognizing at least a portion of the body of a user on the display 21.

Referring to (a) of FIG. 4, the user device 20 may display an iris recognition user interface 410. Also, the user device 20 may recognize the iris of the user by photographing an image in case the two eyes of the user are located in two circles by using a camera (not shown) installed in its inside.

Referring to (b) of FIG. 4, the user device 20 may display a face recognition user interface 420. The user device 20 may photograph an image in case the face of a user is located in an oval by using a camera (not shown) installed in its inside, and recognize the face of the user.

Referring to (c) of FIG. 4, the user device 20 may display a fingerprint recognition user interface 430. Also, the user device 20 may include a fingerprint recognition module in a portion of the display 21. In this case, the user device 20 may display a fingerprint recognition user interface in a specific area of the display 21.

According to the various embodiments of the disclosure, the user device 20 may locate a fingerprint recognition module in a home key or a different area of the user device 20. In this case, the user device 20 may display a user interface guiding to locate a finger on the area on the display 21.

Referring to (d) of FIG. 4, the user device 20 may display a user interface 440 into which a predetermined secret number is input. In this case, the user device may, for example, in case the user touches a secret number input user interface, display a user interface into which characters or numbers can be input in the form of a pop-up on the display 21.

FIG. 5 is a schematic block diagram of a guest device, a user device, and a server according to an embodiment of the disclosure.

Referring to (a) of FIG. 5 to (c) of FIG. 5, the guest device 10 may include a processor 510, a communication part 512, a memory 514, and an input part 516. The user device 20 may include a processor 520, a communication part 522, a memory 524, and a display 523. The server 15 may include a processor 530, a communication part 532, and a memory 534. However, the disclosure is not limited thereto, and the guest device 10, the user device 20, and the server 15 may include more or fewer components.

According to an embodiment of the disclosure, the processors 510, 520, 530 may, for example, operate the software and control at least one other component of the electronic device (e.g.: hardware or software components) connected to the processors 510, 520, 530, and perform various kinds of data processing and operations. Also, the processors 510, 520, 530 may load a command or data received from another component (e.g., the communication part) on a volatile memory and process them, and store the result data in a non-volatile memory.

Also, according to an embodiment of the disclosure, the processors 510, 520, 530 may include a main processor (e.g.: a central processing device or an application processor), and an auxiliary processor which is operated independently from the main processor, and additionally or generally, which uses lower power than the main processor, or is specialized for a designated function (e.g.: a graphic processing device, an image signal processor, a sensor hub processor, or a communication processor). Here, the auxiliary processor may be operated separately from the main processor or by being embedded in the main processor.

In this case, the auxiliary processor may control, for example, in replacement of the main processor while the main processor is in an inactive (e.g.: sleep) state, or together with the main processor while the main processor is in an active (e.g.: performing an application) state, control at least some of the functions or states related to at least one component (e.g.: the input part, or the communication part) among the components of the electronic device. According to an embodiment of the disclosure, the auxiliary processor (e.g.: an image signal processor or a communication processor) may be implemented as some components of another component related in terms of function (e.g.: the communication part, the camera module).

According to an embodiment of the disclosure, the memories 514, 524, 534 may store various data used by at least one component of the electronic device (e.g.: the processors 510, 520, 530), for example, the software, and input data or output data with respect to a command related to this. Also, the memories 514, 524, 534 may include a volatile memory or a non-volatile memory.

Also, according to an embodiment of the disclosure, the communication parts 512, 522, 532 may support establishment of a wired or wireless communication channel with the guest device 10, the user device 20, and the server 15, and performance of communication through the established communication channel. Also, the communication parts 512, 522, 532 may include at least one communication processor supporting wired communication or wireless communication which is operated independently from the processors 510, 520, 530 (e.g.: an application processor).

In addition, according to an embodiment of the disclosure, the communication parts 512, 522, 532 may include a wireless communication module (e.g.: a cellular communication module, a near field wireless communication module, or a global navigation satellite system (GNSS) communication module) or a wired communication module (e.g.: a local area network (LAN) communication module, or an electric power line communication module), and may communicate with an external electronic device through a first network (e.g.: a near field communication network such as Bluetooth, wi-fi direct or infrared data association (IrDA)) or a second network (e.g.: a long distance communication network such as a cellular network, the Internet, or a computer network (e.g.: a LAN or a WAN)) by using the corresponding communication module among them. The aforementioned various types of communication modules may be implemented as one chip or implemented as separate chips, respectively.

Referring to (a) of FIG. 5, in case a command requesting configuration of a guest mode wherein an artificial intelligence assistant function can be used at an external device is received through the input part 516, the processor 510 of the guest device 10 may control the communication part 512 to request identification information including a call word for using the artificial intelligence assistant function to the user device 20, and receive identification information from the user device 20.

According to an embodiment of the disclosure, in the memory 514 of the guest device 10, identification information received from the user device 20 and data used during operation of a guest mode of an artificial intelligence assistant function may be stored. The input part 516 of the guest device 10 may be, for example, a component that can receive a user input such as a microphone, a touch panel, etc. According to the various embodiments of the disclosure, the guest device 10 may further include a display and an output part (e.g.: a speaker, a lighting device, etc.).

Referring to (b) of FIG. 5, in case a signal requesting identification information for using an artificial intelligence assistant function is received, the processor 520 of the user device 20 may generate a user interface requesting user identification for transmission of identification information, and if there is user identification, the processor 520 may control the communication part 522 to transmit identification information to the guest device 10.

According to an embodiment of the disclosure, in the memory 524 of the user device 20, data generated as a user used an artificial intelligence assistant function may be stored. For example, identification information calling an artificial intelligence assistant function, use history of a user, etc. may be stored. Also, the memory 524 of the user device 20 may store information which enables access to the third device received from the guest device 10.

The display 526 of the user device 20 may display a user interface requesting identification for transmission of identification information to the guest device according to control of the processor 520. The display 526 may be in the form of a touch screen receiving a touch input. According to the various embodiments of the disclosure, the user device 20 may further include an output part (e.g.: a speaker, a lighting device, etc.), an input part (e.g.: a microphone), a camera module, etc.

Referring to (c) of FIG. 5, the processor 530 of the server 15 may identify the content included in a voice file received from the guest device 10 or the user device 20 by using a voice recognition algorithm. Also, the processor 530 of the server 15 may transmit and receive data with the guest device 10 or the user device 20 according to the identified content.

Figure 6:
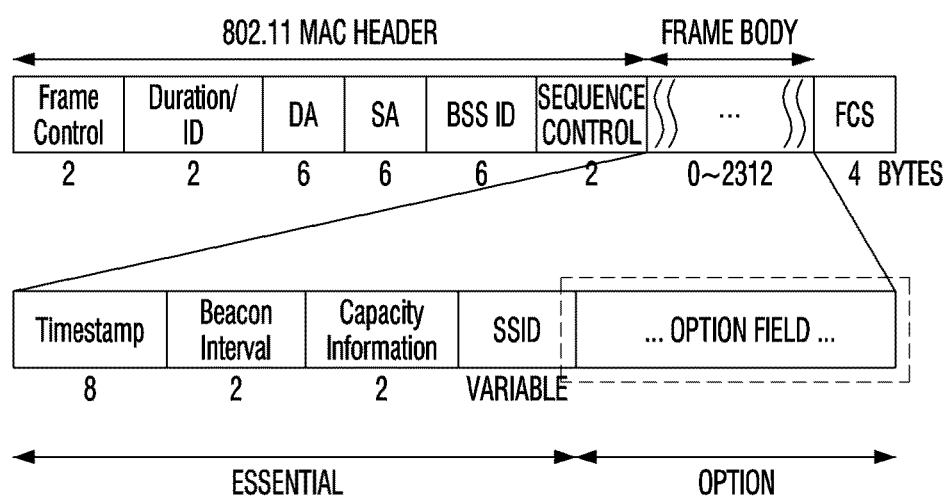
FIG. 6 is a diagram illustrating an embodiment of an identification signal that a guest device transmits to a user device according to an embodiment of the disclosure.

FIG. 6 is a diagram illustrating an embodiment of an identification signal that a guest device transmits to a user device according to an embodiment of the disclosure.

Referring to FIG. 6, a guest device (e.g.: the guest device 10 in FIG. 1A) may, for example, change the communication method to a second communication method, and then generate an identification signal including a structure as described below and search a user device (e.g.: the user device 20 in FIG. 1A).

An identification signal generated by a guest device (e.g.: the guest device 10 in FIG. 1A) may mean, for example, a frame that notifies the existence of a wireless network, and helps the counterpart device to find the wireless network, and broadcasts periodically (e.g., 10 times per second) to participate in the wireless network. In this case, the identification signal may include various types of parameter information related to the wireless network.

An identification signal according to an embodiment of the disclosure may be divided into a header and a frame body.

A header may include, for example, a frame control field, a duration/ID field, a destination address (DA) field and a source address (SA) field, a basic service set identifier (BSS ID) field, and a sequence control field.

A frame control field may be located in the first starting portion of a frame, and may have a size of 2 bytes. Also, a frame control field may contain information related to control of a frame transmitted among each device forming a network.

A duration/ID field is a field having a size of 2 bytes that follows right after the frame control field. Also, a duration/ID field may provide a network allocation vector (NAV) value or a station ID of a ps-poll frame.

A destination address (DA) field and a source address (SA) field may mean physical addresses implemented on hardware having a size of 6 bytes for identification of an electronic device.

A basic service set identifier (BSS ID) field is a numerical value and may mean an identifier of 6 bytes identifying a basic service area or a network ID. A BSS ID field may make several basic service areas identifiable with one another when they co-exist.

A sequence control field is a field having a sizes of 2 bytes that guides to perform a control operation in order according to a set order.

A frame check sequence (FCS) field is a field of 4 bytes located in the end portion of a frame, and is a field inserted to help detection of an error on the receiver side.

A frame body may be flexibly constituted with several fields/elements having a fixed or variable length according to a purpose of management. A frame body may include, for example, a timestamp field, a beacon interval field, a capacity information field, an SSID field, and an option field.

A timestamp field is a field having a size of 8 bytes, and is a field for synchronization among each device in a basic service area.

A beacon interval field has a size of 2 bytes, and may display a transmission cycle (or, a time interval) of a beacon frame.

A capacity information field has a size of 2 bytes, and may be mainly used for a beacon frame, a probe response frame, etc.

An SSID field is a variable field, and has a character value, and may mean the name of a service provider that groups several access points and manages them under control of one IP subnet.

An option field may include various information. According to an embodiment of the disclosure, in the disclosure, an option field may include definition for an interface method between a guest device (e.g.: the guest device 10 in FIG. 1A) and a user device (e.g.: the guest device 20 in FIG. 1B). For example, a guest device (e.g.: the guest device 10 in FIG. 1A) and a user device (e.g.: the guest device 20 in FIG. 1B) may define an interactive communication method based on a natural language.

In this case, the two devices (e.g.: a guest device, a user device) may transmit and receive a voice input by a user in the form of a file, or change a voice input by a user to the form of a structured text (e.g., a comma separated value (CSV), an extensible markup language (XML), a hypertext markup language (HTML), a java script object notation (JSON), etc.), or change a voice input by a user to the form of a natural language text, and transmit and receive the text.

Figure 7:
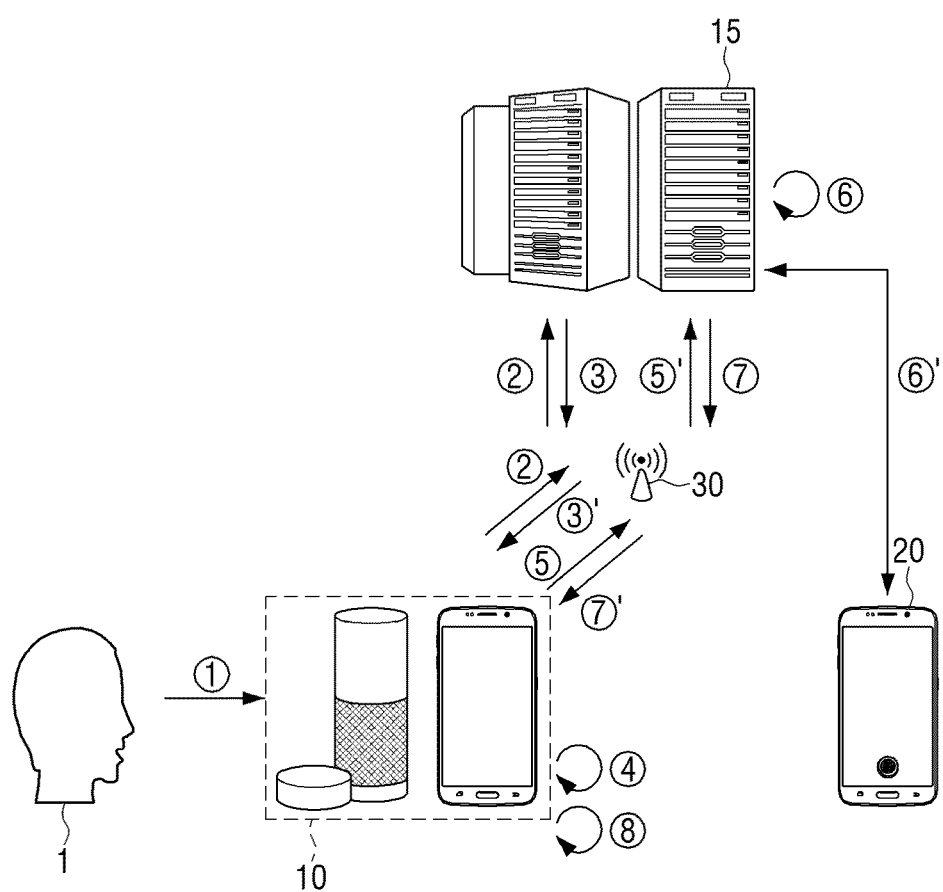
FIG. 7 is a diagram for illustrating utilization of a guest mode in case a user device and a guest device use the same artificial intelligence assistant function according to an embodiment of the disclosure.

FIG. 7 is a diagram for illustrating utilization of a guest mode in case a user device and a guest device use the same artificial intelligence assistant function according to an embodiment of the disclosure.

In the action ①, the guest device 10 may receive a command of a user wishing to display an image by using an artificial intelligence assistant function. Hereinafter, explanation will be made based on the assumption that the call word of the artificial intelligence assistant is "Bixby." The command of the user 1 may be, for example, "Bixby, display the pictures photographed in August." Then, the guest device 10 may receive the utterance of the user 1, and recognize the content included in the received utterance by using an intelligent app such as a voice recognition app.

According to the various embodiments of the disclosure, the guest device 10 may identify the content included in the command received from the user 1 by using the A server 15.

For example, in the action ②, the guest device 10 may transmit the received command to the third device 30. Also, in the action ②', the A sever 15 may receive the command of the user. The A server 15 may receive the utterance of the user 1 and recognize the content of the utterance by using an intelligent program such as a voice recognition program.

In the action ③, the A server 15 may transmit the content of the utterance to the third device 30. Also, in the action ③', the guest device 10 may receive the content of the utterance wishing to display an image.

According to the various embodiments of the disclosure, in case the guest device 10 recognizes a user utterance by using an intelligent app such as a voice recognition app, the actions ②, ②', ③, and ③' may be omitted.

In the action ④, the guest device 10 may divide the command of the user 1 into an action to be performed by the guest device 10 and an action to be performed by the server 15. For example, the guest device 10 may determine that displaying an image is the action of the guest device 10, and acquiring image files (e.g.: images photographed in August) is the action of the server 15.

In the action ⑤, the guest device 10 may request the server 15 to transmit the files of "the images photographed in August." For example, the guest device 10 may transmit a text based on a natural language such as "Bixby, transmit the image files photographed in August" to the third device 30.

Also, in the action ⑤, the server 15 may receive the request of the guest device 10 which is "Bixby, transmit the image files photographed in August" from the third device 30.

In the action ⑥, the server 15 may search image files corresponding to the request of the guest device 10 (e.g., the image files photographed in August). Also, in the action ⑥, in case image files corresponding to the request of the guest device 10 (e.g., the image files photographed in August) do not exist at the server 15, the server 15 may request image files corresponding to the request of the guest device 10 (e.g., the image files photographed in August) to the user device 20 connected through a communication network, and receive the files.

In the action ⑦, the server 15 may transmit the image files to the third device 30.

Also, in the action ⑦, the guest device 10 may receive the image files from the third device 30.

In the action ⑧, the guest device 10 may execute an image play application, and display the received image files (e.g., the image files photographed in August).

FIG. 8 is a flow chart illustrating a method for executing a guest mode of an artificial intelligence assistant function according to an embodiment of the disclosure.

Referring to the action 810, the guest device 10 may receive a command requesting configuration of a guest mode of an artificial intelligence assistant function. Also, the guest device 10 may receive a user utterance and recognize the content included in the utterance by using an intelligent app such as a voice recognition app. In this case, the guest device 10 may transmit the received command to a server establishing a communication network for an artificial intelligence assistant function and recognize the content included in the utterance.

Referring to the action 820, the guest device 10 may change a first communication method to a second communication method. For example, the guest device 10 may change a wi-fi mode to an ad-hoc mode or a wi-fi direct mode.

Referring to the action 830, the guest device 10 may request identification information for using an artificial intelligence assistant function to the user device 20 by using the second communication method.

Referring to the action 840, the user device 20 may generate a user interface requesting user identification for transmission of identification information and display the user interface. For example, the user device 20 may receive user identification by using a voice recognition function.

Referring to the action 850, the user device 20 may transmit identification information to the guest device 10.

Referring to the action 860, the guest device 10 that received identification information may transmit information which enables connection to the first communication method to the user device 20.

Referring to the action 870, the guest device 10 may change the second communication method to the first communication method. For example, the guest device 10 may change an ad-hoc mode or a wi-fi direct mode to a wi-fi mode.

Referring to the action 880, the user device 20 may be connected with the guest device 10 by establishing a communication network by using connection information which enables connection to the first communication method.

Referring to the action 890, the user device 20 may transmit a connection completion message to the guest device 10.

Figure 9A:
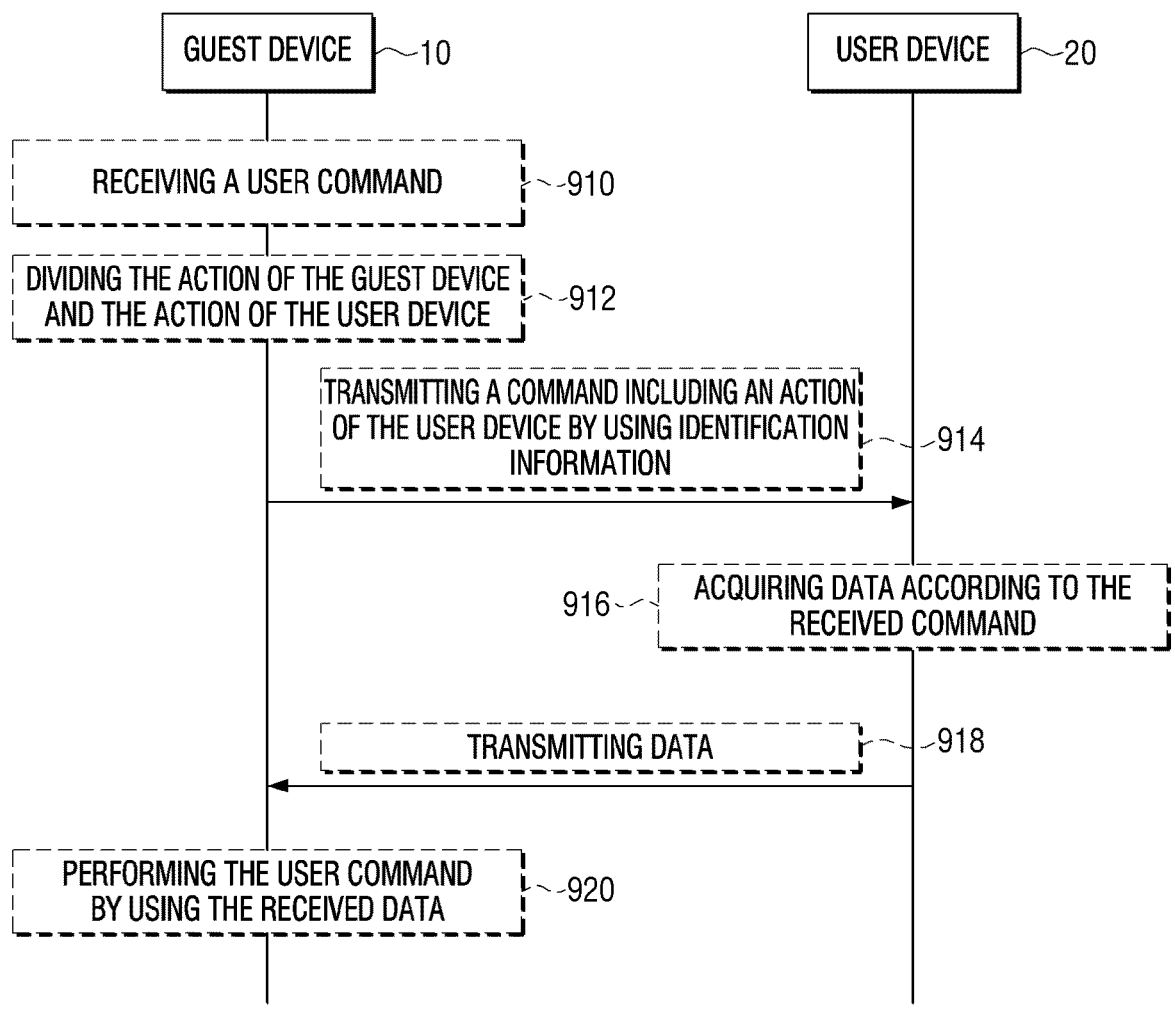
FIG. 9A is a flow chart illustrating a situation wherein a guest mode of an artificial intelligence assistant is utilized by using a user device according to an embodiment of the disclosure.

FIG. 9A is a flow chart illustrating a situation wherein a guest mode of an artificial intelligence assistant is utilized by using a user device according to an embodiment of the disclosure.

Referring to the action 910, the guest device 10 may receive a command of a user wishing to use an artificial intelligence assistant.

Referring to the action 912, the guest device 10 may divide an action to be performed by the guest device 10 and an action to be performed by the user device 20 in the received command. For example, in case the user command is "Bixby, tell me about today's schedule," the guest device 10 may determine that acquiring today's schedule is the action of the user device 20, and displaying the received schedule is the action of the guest device 10.

Referring to the action 914, the guest device 10 may transmit a command including an action of the user device 20 to the user device 20 by using the previously received identification information of the artificial intelligence assistant used by the user device 20. For example, the guest device 10 may transmit a text based on a natural language such as "Bixby, send me today's schedule" to the user device 20.

Referring to the action 916, the user device 20 may acquire data according to the received command. For example, the user device 20 may acquire today's schedule of the user stored in a schedule application. According to the various embodiments of the disclosure, the user device 20 may acquire today's schedule of a user by being interlocked with a server supporting an artificial intelligence assistant function.

Referring to the action 918, the user device 20 may transmit data to the guest device 10.

Referring to the action 920, the guest device 10 may perform the user command by using the received data. For example, the guest device 10 may provide the received today's schedule of the user through a speaker, or display the schedule through a display.

Figure 9B:
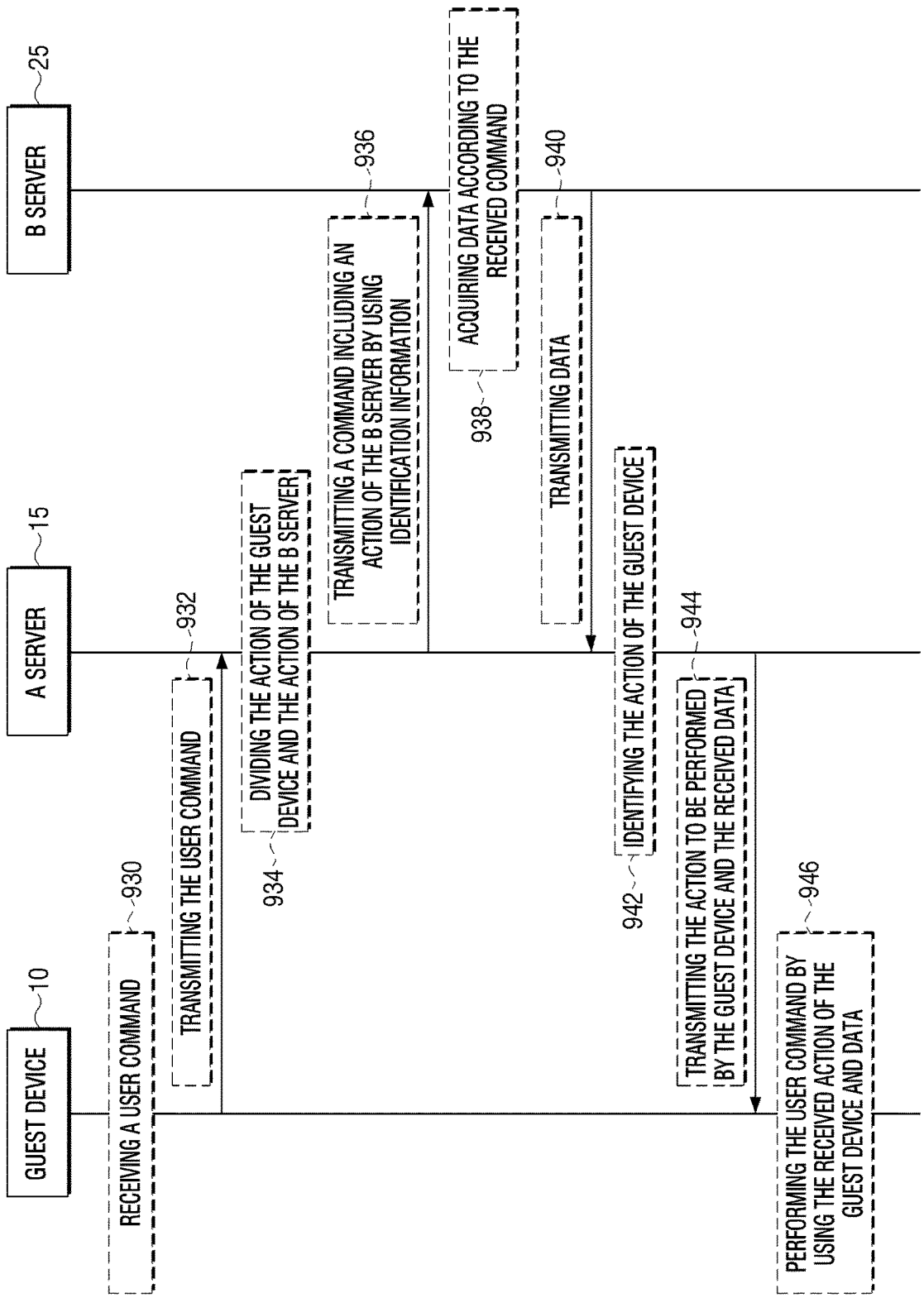
FIG. 9B is a flow chart illustrating a situation wherein a guest mode of an artificial intelligence assistant is utilized by using a server according to an embodiment of the disclosure.

FIG. 9B is a flow chart illustrating a situation wherein a guest mode of an artificial intelligence assistant is utilized by using a server according to an embodiment of the disclosure.

Referring to the action 930, the guest device 10 may receive a command of the user wishing to use the artificial intelligence assistant. The command of the user may be, for example, "Bixby, tell me tomorrow's schedule."

Referring to the action 932, the guest device 10 may transmit the received user command to the A server 15.

Referring to the action 934, the A server 15 may divide an action to be performed by the guest device 10 and an action to be performed by the B server 25 in the received command. For example, the A server 15 may determine that acquiring tomorrow's schedule is the action of the B server 25, and displaying the received schedule is the action of the guest device 10.

Referring to the action 936, the A server 15 may transmit a command including an action of the B server 25 to the B server 25 by using the previously received identification information of the artificial intelligence assistant used by the B server 25. For example, the A server 15 may transmit a text based on a natural language such as "Bixby, send me tomorrow's schedule" to the B server 25.

Referring to the action 938, the B server 25 may acquire data according to the received command. For example, the B server 25 may acquire a specific file of the user (e.g., the file of tomorrow's schedule of the user) stored in the memory. According to the various embodiments of the disclosure, the B server 25 may acquire a specific file of a user (e.g., the file of tomorrow's schedule of a user) by being interlocked with the user device 20.

Referring to the action 940, the B server 25 may transmit the acquired data to the A server 15.

Referring to the action 942, the A server 15 may identify the action of the guest device 10.

Referring to the action 944, the A server 15 may transmit the action to be performed by the guest device 10 and the received data to the guest device 10. For example, the A server 15 may order the guest device 10 to execute a schedule management application.

Referring to the action 946, the guest device 10 may perform the user command by using the received action to be performed by the guest device 10 and data. For example, the guest device 10 may provide the received tomorrow's schedule of the user through a speaker, or display the schedule through a display.

FIG. 9C is a diagram for illustrating another situation wherein a guest mode of an artificial intelligence assistant is utilized by using a server according to an embodiment of the disclosure.

Referring to the action 950, the guest device 10 may receive a command of a user wishing to use an artificial intelligence assistant.

Referring to the action 952, the guest device 10 may divide an action to be performed by the guest device 10 and an action to be performed by the B server 25 in the received command. For example, in case the user command is "Bixby, show me the document I drafted yesterday," the guest device 10 may determine that acquiring the document drafted yesterday is the action of the B server 25, and displaying the received document is the action of the guest device 10.

Referring to the action 954, the guest device 10 may transmit a command including an action of the B server 25 to the B server 25 by using the previously received identification information of the artificial intelligence assistant used by the B server 25. For example, the guest device 10 may transmit a text based on a natural language such as "Bixby, show me the document I drafted yesterday" to the B server 25.

Referring to the action 956, the B server 25 may acquire data according to the received command. For example, the B server 25 may acquire a document file (e.g., the document file that the user drafted yesterday) stored in a document drafting application. According to the various embodiments of the disclosure, the B server 25 may acquire a document file (e.g., the document file that the user drafted yesterday) by being interlocked with the user device 20.

Referring to the action 958, the user device 20 may transmit the acquired data to the guest device 10.

Referring to the action 920, the guest device 10 may perform the user command by using the received data. For example, the guest device 10 may display the received document file (e.g., the document file that the user drafted yesterday) through a display.

Figure 10:
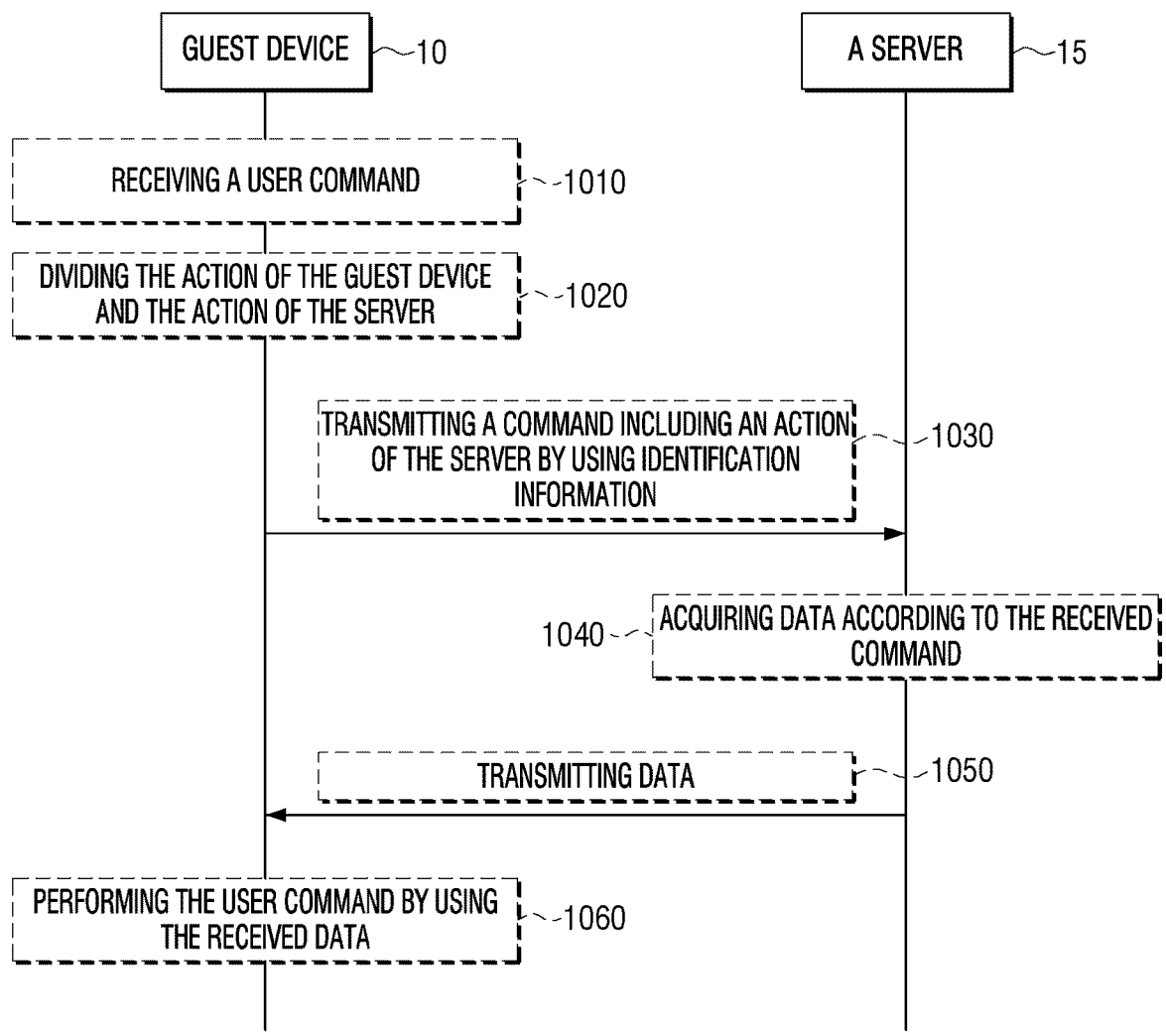
FIG. 10 is a flow chart illustrating a situation wherein a guest mode is utilized in case a guest device and a user device use the same artificial intelligence assistant function according to an embodiment of the disclosure.

FIG. 10 is a flow chart illustrating a situation wherein a guest mode is utilized in case a guest device and a user device use the same artificial intelligence assistant function according to an embodiment of the disclosure.

Referring to the action 1010, the guest device 10 may receive a command of a user wishing to use an artificial intelligence assistant.

Referring to the action 1020, the guest device 10 may divide an action to be performed by the guest device and an action to be performed by the user device in the received command. For example, in case the user command is "Bixby, play Beethoven Symphony No. 5," the guest device 10 may determine that acquiring the music file of Beethoven Symphony No. 5 is the action of the A server 15, and playing the received music file is the action of the user device 20.

Referring to the action 1030, the guest device 10 may transmit a command including an action of the A server 15 to the user device 20 by using the identification information of the artificial intelligence assistant. For example, the guest device 10 may transmit a text based on a natural language such as "Bixby, send me the music file of Beethoven Symphony No. 5" to the A server 15.

Referring to the action 1040, the A server 15 may acquire data according to the received command. For example, the A server 15 may acquire a music file (e.g., the music file of Beethoven Symphony No. 5) stored in the memory. According to the various embodiments of the disclosure, the A server 15 may acquire a music file (e.g., the music file of Beethoven Symphony No. 5) by being interlocked with the user device using an artificial intelligence assistant function.

Referring to the action 1050, the A server 15 may transmit data (e.g., a music file) to the guest device 10.

Referring to the action 1060, the guest device 10 may perform the user command by using the received data. For example, the guest device 10 may play the received music file (e.g., the music file of Beethoven Symphony No. 5) through a speaker.

Figure 11A:
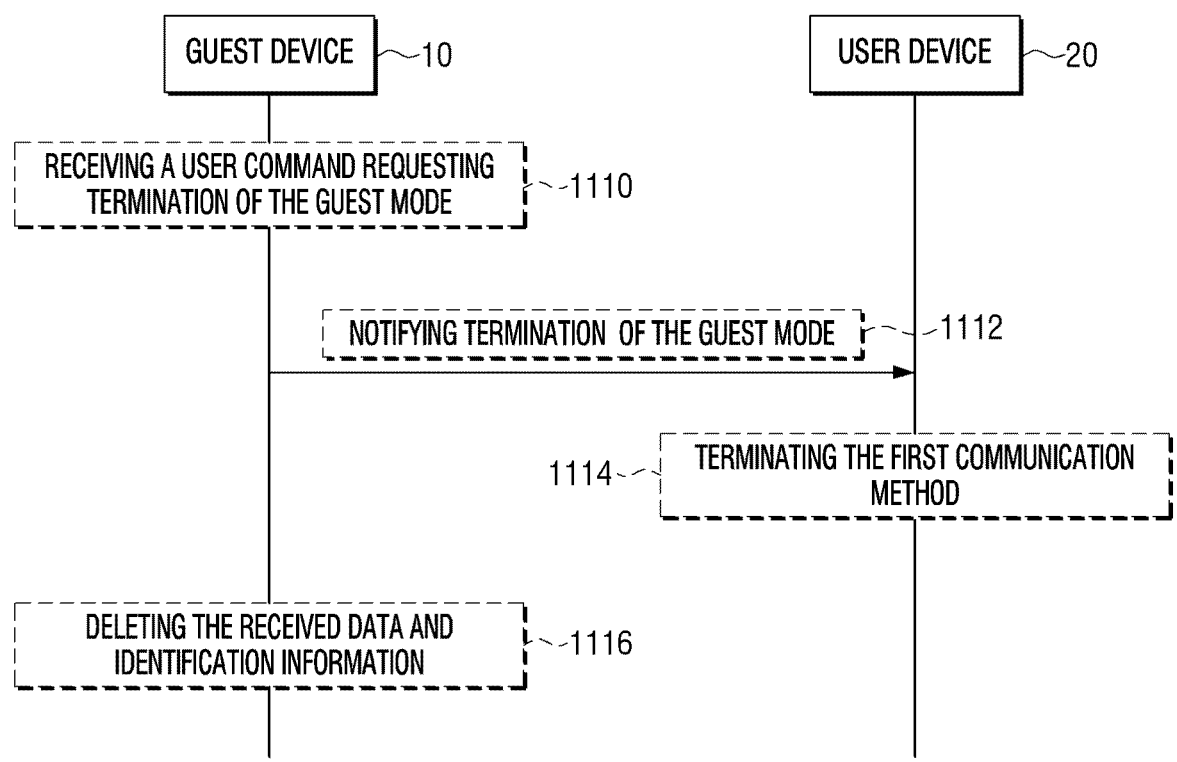
FIG. 11A is a flow chart illustrating a situation wherein an artificial intelligence assistant function is terminated by using a guest device according to an embodiment of the disclosure.

FIG. 11A is a flow chart illustrating a situation wherein an artificial intelligence assistant function is terminated by using a guest device according to an embodiment of the disclosure.

Referring to the action 1110, the guest device 10 may receive a command of a user wishing to terminate a guest mode of an artificial intelligence assistant function.

Referring to the action 1112, the guest device 10 may notify to the user device 20 that a command of a user requesting termination of a guest mode has been received. For example, the guest device 10 may transmit a text based on a natural language such as "Bixby, the guest mode will be terminated" to the user device 20.

Referring to the action 1114, the user device 20 may terminate the first communication method which formed a communication network with the guest device 10.

Referring to the action 1116, the guest device 10 may delete the received data and identification information. For example, the guest device 10 may execute a guest mode of an artificial intelligence assistant function and delete identification information received from the user device 20 and all data received from the user device 20 or an external server.

Figure 11B:
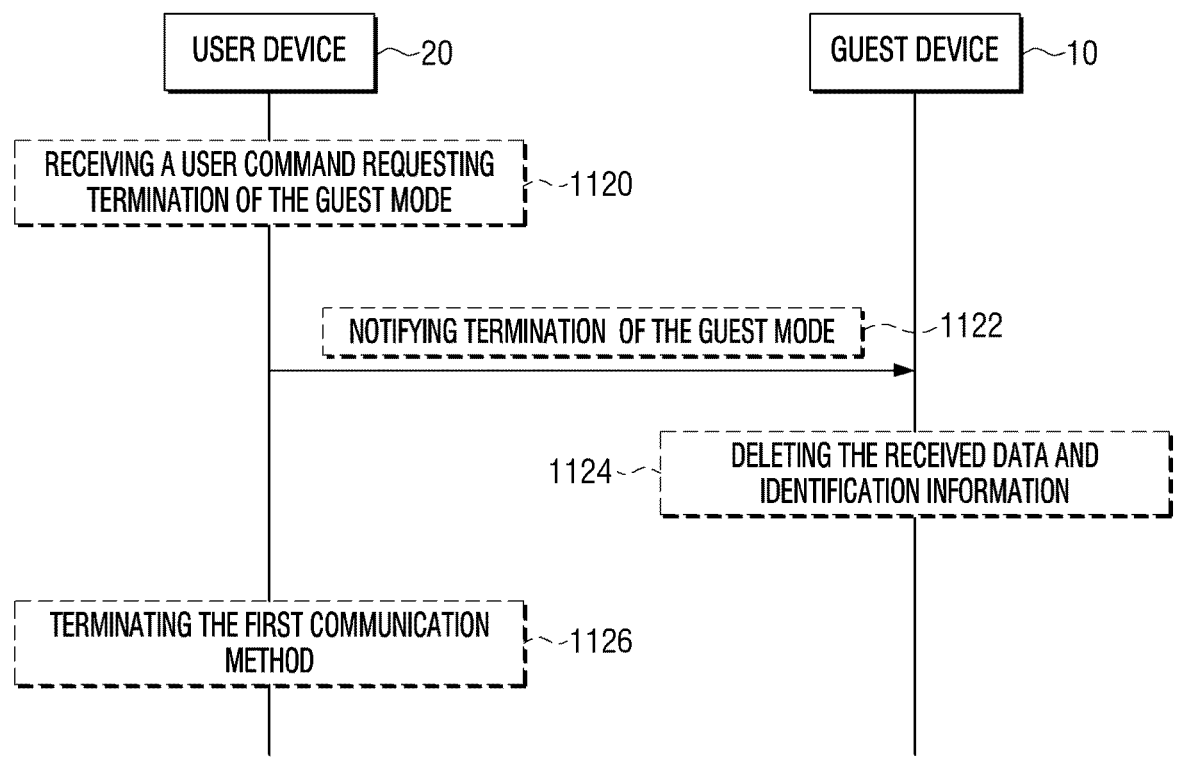
FIG. 11B is a flow chart illustrating a situation wherein an artificial intelligence assistant function is terminated by using a user device according to an embodiment of the disclosure.

FIG. 11B is a flow chart illustrating a situation wherein an artificial intelligence assistant function is terminated by using a user device according to an embodiment of the disclosure.

Referring to the action 1120, the user device 20 may receive a command of a user wishing to terminate a guest mode of an artificial intelligence assistant.

Referring to the action 1122, the user device 20 may notify to the guest device 10 that a command of a user requesting termination of a guest mode has been received.

Referring to the action 1124, the guest device 10 may delete the received data and identification information. For example, the guest device 10 may execute a guest mode of an artificial intelligence assistant function and delete identification information received from the user device 20 and all data received from the user device 20 or an external server.

Referring to the action 1126, the user device 20 may terminate the first communication method which formed a communication network with the guest device 10.

Figure 12:
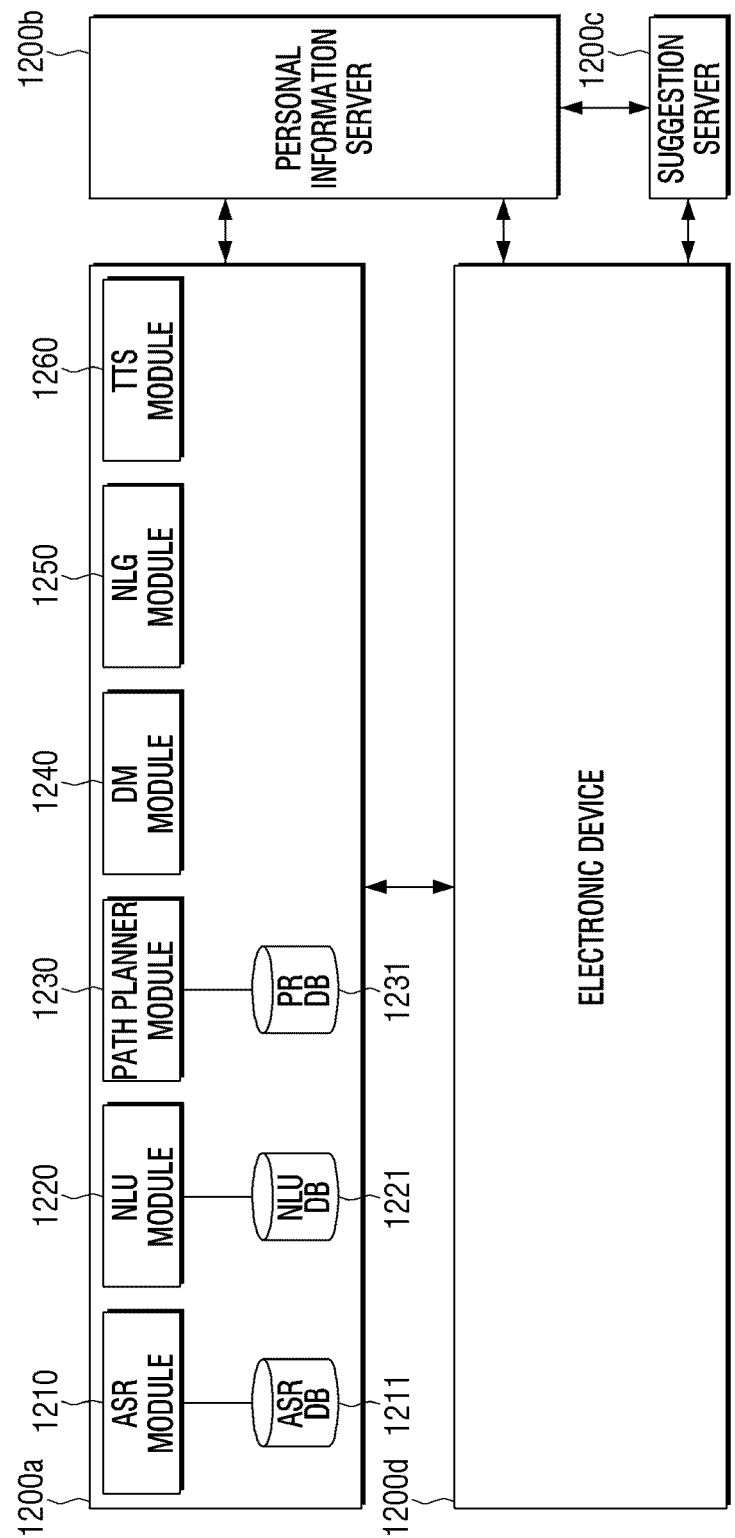
FIG. 12 is a diagram for illustrating a method for operating an artificial intelligence assistant function according to an embodiment of the disclosure.

FIG. 12 is a diagram for illustrating a method for operating an artificial intelligence assistant function according to an embodiment of the disclosure.

Referring to FIG. 12, an artificial intelligence assistant function may include an electronic device 1200*d* including a guest device 10 and a user device 20, an intelligent server 1200*a*, a personal informatization server 1200*b*, and a suggestion server 1200*c*. According to the various embodiments of the disclosure, the intelligent server 1200*a*, the personal informatization server 1200*b*, and the suggestion server 1200*c* may be constituted as one server as in FIG. 1A.

The intelligent server 1200*a* may include an automatic speech recognition (ASR) module 1210, a natural language understanding (NLU) module 1220, a path planner module 1230, a dialogue manager (DM) module 1240, a natural language generator (NLG) module 1250, or a text to speech (TTS) module 1260.

The natural language understanding module 1220 or the path planner module 1230 of the intelligent server 1200*a* may generate a path rule.

According to an embodiment of the disclosure, the automatic speech recognition (ASR) module 1210 may convert a user input received from the electronic device 1200*d* into text data.

According to an embodiment of the disclosure, the automatic speech recognition module 1210 may convert a user input received from the electronic device 1200*d* into text data. For example, the automatic speech recognition module 1210 may include an utterance recognition module. The utterance recognition module may include an acoustic model and a language model. For example, the acoustic model may include information related to vocalization, and the language model may include unit phoneme information and information on combination of unit phoneme information. The utterance recognition module may convert a user utterance into text data by using the information related to vocalization and the information related to unit phoneme information. Information on the acoustic model and the language model may be stored, for example, in an automatic speech recognition database (ASR DB) 1211.

According to an embodiment of the disclosure, the natural language understanding module 1220 may identify a user intent by performing syntactic analysis or semantic analysis. The syntactic analysis may divide a user input into syntactic units (e.g.: a word, a phrase, a morpheme, etc.), and identify which syntactic elements the divided units have. The semantic analysis may be performed by using semantic matching, rule matching, formula matching, etc. Accordingly, the natural language understanding module 1220 may acquire the domain and the intent of a user input, or a parameter (or, a slot) necessary for expressing the intent.

According to an embodiment of the disclosure, the natural language understanding module 1220 may determine an intent of a user and a parameter by using matching rules divided into a domain, an intent, and a parameter (or, a slot) necessary for identifying the intent. For example, the one domain (e.g.: notification) may include a plurality of intents (e.g.: notification setting, notification release, etc.), and one intent may include a plurality of parameters (e.g.: the time, the number of repetition, the notification sound, etc.). A plurality of rules may include, for example, at least one essential element parameter. The matching rules may be stored in a natural language understanding database (NLU DB) 1221.

According to an embodiment of the disclosure, the natural language understanding module 1220 may determine a user intent by identifying the meaning of words extracted from a user input by using linguistic characteristics (e.g.: syntactic elements) such as a morpheme, a phrase, etc., and matching the identified meaning of the words with a domain and an intent. For example, the natural language understanding module 1220 may determine a user intent by calculating how many of the words extracted from a user input are included in each domain and intent. According to an embodiment of the disclosure, the natural language understanding module 1220 may determine the parameter of the user input by using a word which became a basis for identifying the intent. Also, according to an embodiment of the disclosure, the natural language understanding module 1220 may determine a user intent by using a natural language understanding database 1221 storing linguistic characteristics for identifying the intent of a user input. According to another embodiment of the disclosure, the natural language understanding module 1220 may determine a user intent by using a personal language model (PML). For example, the natural language understanding module 1220 may determine a user intent by using personal information (e.g.: a contact list, a music list). The personal language model may be stored, for example, in the natural language understanding database 1221. According to an embodiment of the disclosure, not only the natural language understanding module 1220 but also the automatic speech recognition module 1210 may recognize a user voice by referring to a personal language model stored in the natural language understanding database 1221.

According to an embodiment of the disclosure, the natural language understanding module 1220 may generate a path rule based on an intent of a user input and a parameter. For example, the natural language understanding module 1220 may select an app to be executed based on an intent of a user input, and determine an action to be performed at the selected app. The natural language understanding module 1220 may generate a path rule by determining a parameter corresponding to the determined action. According to an embodiment of the disclosure, the path rule generated by the natural language understanding module 1220 may include information on the app to be executed, the action to be executed at the app, and the parameter necessary for executing the action.

According to an embodiment of the disclosure, the natural language understanding module 1220 may generate one path rule, or a plurality of path rules based on an intent of a user input and a parameter. For example, the natural language understanding module 1220 may receive a path rule set corresponding to the electronic device 1200*d* from the path planner module 1230, and map the intent of the user input and the parameter with the received path rule set, and thereby determine the path rule.

According to another embodiment of the disclosure, the natural language understanding module 1220 may generate one path rule, or a plurality of path rules by determining an app to be executed, an action to be performed at the app, and a parameter necessary for executing the app based on an intent of a user input and a parameter. For example, the natural language understanding module 1220 may generate a path rule by arranging the app to be executed and the action to be executed at the app in the form of ontology or a graph model by using the information of the electronic device 1200*d*. The generated path rule may be stored, for example, in a path rule database (PR DB) 1231 through the path planner module 1230. Also, the generated path rule may be added to the path rule set of the database 1231.

According to an embodiment of the disclosure, the natural language understanding module 1220 may select at least one path rule among the plurality of generated path rules. For example, the natural language understanding module 1220 may select the optimal path rule among the plurality of path rules. As another example, the natural language understanding module 1220 may select a plurality of path rules in case only some actions are specified based on a user utterance. Also, the natural language understanding module 1220 may determine one path rule among the plurality of path rules by an additional input of the user.

According to an embodiment of the disclosure, the natural language understanding module 1220 may transmit a path rule to the electronic device 1200*d* in response to a user input. For example, the natural language understanding module 1220 may transmit one path rule corresponding to a user input to the electronic device 1200*d*. As another example, the natural language understanding module 1220 may transmit a plurality of path rules corresponding to a user input to the electronic device 1200*d*. The plurality of path rules may be generated, for example, by the natural language understanding module 1220 in case only some actions are specified based on a user utterance.

According to an embodiment of the disclosure, the path planner module 1230 may select at least one path rule among a plurality of path rules.

According to an embodiment of the disclosure, the path planner module 1230 may transmit a path rule set including a plurality of path rules to the natural language understanding module 1220. The plurality of path rules of the path rule set may be stored in the form of a table in the path rule database 1231 connected to the path planner module 1230. For example, the path planner module 1230 may transmit a path rule set corresponding to the information of the electronic device 1222*d* (e.g.: OS information, app information) to the natural language understanding module 1220. The table stored in the path rule database 1231 may be stored, for example, for each domain or each version of domain.

According to an embodiment of the disclosure, the path planner module 1230 may select one path rule, or a plurality of path rules in a path rule set and transmit them to the natural language understanding module 1220. For example, the path planner module 1230 may match an intent of a user and a parameter with a path rule set corresponding to the electronic device 1200*d*, and select one path rule, or a plurality of path rules, and transmit them to the natural language understanding module 1220.

According to an embodiment of the disclosure, the path planner module 1230 may generate one path rule, or a plurality of path rules by using an intent of a user and a parameter. For example, the path planner module 1230 may determine an app to be executed and an action to be executed at the app based on an intent of a user and a parameter, and generate one path rule, or a plurality of path rules. According to an embodiment of the disclosure, the path planner module 1230 may store the generated path rules in the path rule database 1231.

According to an embodiment of the disclosure, the path planner module 1230 may store the path rules generated in the natural language understanding module 1220 in the path rule database 1231. The generated path rules may be added to the path rule set stored in the path rule database 1231.

According to an embodiment of the disclosure, a table stored in the path rule database 1231 may include a plurality of path rules or a plurality of path rule sets. The plurality of path rules or the plurality of path rule sets may reflect the kind, the version, the type, or the characteristic of the device performing each path rule.

According to an embodiment of the disclosure, the dialogue manager module 1240 may determine whether an intent of a user identified by the natural language understanding module 1220 is clear. For example, the dialogue manager module 1240 may determine whether an intent of a user is clear based on whether information on a parameter is sufficient. The dialogue manager module 1240 may determine whether a parameter identified at the natural language understanding module 1220 is sufficient for performing a task. According to an embodiment of the disclosure, in case an intent of a user is not clear, the dialogue manager module 1240 may perform a feedback requesting necessary information to the user. For example, the dialogue manager module 1240 may perform a feedback requesting information for a parameter for identifying an intent of a user.

According to an embodiment of the disclosure, the dialogue manager module 1240 may include a content provider module. In case the content provider module can perform an action based on an intent identified at the natural language understanding module 1220 and a parameter, the content provider module can generate a result of performing a task corresponding to a user input. According to an embodiment of the disclosure, the dialogue manager module 1240 may transmit the result generated at the content provider module to the electronic device 1200*d* as a response to a user input.

According to an embodiment of the disclosure, the natural language generator (NLG) module 1250 may change designated information to the form of a text. The information changed to the form of a text may be in the form of a natural language utterance. The designated information may be, for example, information on an additional input, information informing completion of an action corresponding to a user input, or information informing an additional input of a user (e.g.: information on a feedback for a user input). The information changed to the form of a text may be transmitted to the electronic device 1200*d* and displayed on a display, or transmitted to the text to speech (TTS) module 1260 and changed to the form of a voice.

According to an embodiment of the disclosure, the text to speech (TTS) module 1260 may change information in the form of a text to information in the form of a voice. Also, the text to speech module 1260 may receive information in the form of a text from the natural language generator module 1250, and change the information in the form of a text to information in the form of a voice and transmit the information to the electronic device 1200*d*. The electronic device 1200*d* may output the information in the form of a voice through a speaker.

According to an embodiment of the disclosure, the natural language understanding module 1220, the path planner module 1230, and the dialogue manager module 1240 may be implemented as one module. For example, the natural language understanding module 1220, the path planner module 1230, and the dialogue manager module 1240 may be implemented as one module and determine an intent of a user and a parameter, and generate a response (e.g.: a path rule) corresponding to the determined intent of a user and parameter. Accordingly, the generated response may be transmitted to the electronic device 1200*d*.

Some embodiments of the disclosure may also be implemented in the form of a recording medium including an instruction executable by a computer such as a program module executed by a computer. A computer-readable medium may be any available medium that can be accessed by a computer, and includes all of volatile and non-volatile media, and separable and non-separable media. Also, a computer-readable medium may include both of a computer storage medium and a communication medium. A computer storage medium includes all of volatile and non-volatile media, and separable and non-separable media implemented by any method or technology for storage of information such as a computer-readable instruction, a data structure, a program module, or other data. A communication medium typically includes a computer-readable instruction, a data structure, a program module, or other data of a modulated data signal such as a carrier wave, or other transmission mechanisms, and also includes any information transmission media.

Also, the method according to the embodiments described herein may be provided as a computer program product.

A computer program product may include a S/W program, a storage medium that can be read by a computer storing a S/W program, and a product traded between a seller and a buyer.

For example, a computer program product may include a product in the form of a S/W program (e.g., a downloadable app) that is electronically distributed through an electronic device or the manufacturer of an electronic device or an electronic market (e.g., Google Play Store, App Store). For electronic distribution, at least a portion of a S/W program may be stored in a storage medium, or may be generated temporarily. In this case, the storage medium may be the manufacturer or the server of an electronic market, or the storage medium of a relay server.

Also, in this specification, "a part" may be a hardware component such as a processor or a circuit, and/or a software component executed by a hardware component such as a processor.

The aforementioned descriptions of the disclosure are exemplary descriptions of the disclosure, and a person having ordinary skill in the technical field to which the disclosure belongs would be able to understand that the disclosure can be easily modified into another specific form without changing the technical idea or essential characteristics of the disclosure. Therefore, the embodiments described above should be understood as exemplary embodiments in all aspects but not as restrictive embodiments. For example, each component that is described as a single-type may be implemented while being dispersed, and likewise, components that are described as being dispersed may be implemented in a combined form.

Also, the scope of the disclosure is described more sufficiently by the appended claims, rather than by the detailed description above, and it should be interpreted that all modifications or modified forms derived from the meaning and the scope of the claims and an equivalent concept thereto are included in the scope of the disclosure.

What is claimed is:
1. An electronic device comprising:
a display;
communication circuitry;
memory storing instructions; and
at least one processor configured to execute the instructions and to control the electronic device to at least:
receiving from another electronic device, through the communication circuitry using a first communication method, a signal for requesting transmission of identification information including a first call word for using a first artificial intelligence (AI) assistant function of the electronic device, wherein a second AI assistant function included in the another electronic device is used based on a second call word different from the first call word;
based on receiving the request signal, displaying on the display a user interface for requesting confirmation for transmission of the identification information;
transmitting the identification information including the first call word to the another electronic device through the communication circuitry using the first communication method, based on confirmation for transmission; and
receiving information for using a second communication method from the another electronic device through the communication circuitry.

2. The electronic device of claim 1, wherein at least one processor is configured to establish a connection to the another electronic device using the second communication method.

3. The electronic device of claim 2, wherein at least one processor is configured to, based on receiving through the connection a command requesting to terminate the second artificial intelligence assistant function from the another electronic device, terminate the connection to the another electronic device.

4. The electronic device of claim 1, wherein at least one processor is configured to, based on obtaining a command requesting to terminate the artificial intelligence assistant function, transmit, to the another electronic device, a command requesting deleting data transmitted from the electronic device.

5. The electronic device of claim 1, wherein at least one processor is configured to connect to an access point to which the another electronic device is connected using the information for using the second communication method.

6. The electronic device of claim 1, wherein at least one processor is configured to:
   receive a command including an action of the electronic device from the another electronic device through the communication circuitry,
   obtain data according to the received command, and
   control the communication circuitry to transmit the obtained data to the another electronic device.

7. A control method for an electronic device, the method comprising:
   receiving from another electronic device, using a first communication method, a signal for requesting transmission of identification information including a first call word for using a first artificial intelligence (AI) assistant function of the electronic device, wherein a second AI assistant function included in the another electronic device is used based on a second call word different from the first call word;
   based on receiving the request signal, transmitting the identification information including the first call word to the another electronic device, based on confirmation for transmission; and
   receiving information for using a second communication method from the another electronic device.

8. The control method of claim 7, comprising:
   connecting to the another electronic device using the second communication method.

9. The control method of claim 8, comprising:
   based on receiving through the connection a command requesting to terminate the artificial intelligence assistant function from the another electronic device, terminating the connection to the another electronic device.

10. The control method of claim 7, comprising:
    based on obtaining a command requesting to terminate the artificial intelligence assistant function, transmitting, to the another electronic device, a command requesting deleting data transmitted from the electronic device.

11. The control method of claim 7, comprising:
    connecting to an access point to which the another electronic device is connected using the information for using the second communication method.

12. The control method of claim 7, comprising:
    receiving a command including an action of the electronic device from the another electronic device,
    obtaining data according to the received command, and
    transmitting the obtained data to the another electronic device.

13. One or more non-transitory computer readable recording media storing instructions configured to be executed by at least one processor of an electronic device, the instructions, when executed, causing the at least one processor to control the electronic device to at least:
   receiving from another electronic device, using a first communication method, a signal for requesting transmission of identification information including a first call word for using a first artificial intelligence (AI) assistant function of the electronic device, wherein a second AI assistant function included in the another electronic device is used based on a second call word different from the first call word,
   based on receiving the request signal, transmitting the identification information including the first call word to the another electronic device using the first communication method, based on confirmation for transmission; and
   receiving information for using a second communication method from the another electronic device.

14. The one or more non-transitory computer readable recording media of claim 13, wherein the instructions, when executed, cause at least one processor to control the electronic device to, based on receiving a command requesting to terminate the artificial intelligence assistant function from the another electronic device, terminate a connection to the another electronic device.

15. The one or more non-transitory computer readable recording media of claim 13, wherein the instructions, when executed, cause at least one processor to control the electronic device to, based on obtaining a command requesting to terminate the artificial intelligence assistant function, transmit, to the another electronic device, a command requesting deleting data transmitted from the electronic device.

16. The one or more non-transitory computer readable recording media of claim 13, wherein the instructions, when executed, cause at least one processor to control the electronic device to connect to an access point to which the another electronic device is connected using the information for using the second communication method.

* * * * *